(12) United States Patent
Hall et al.

(10) Patent No.: US 11,673,439 B2
(45) Date of Patent: Jun. 13, 2023

(54) WEIGHT DISTRIBUTION HITCH WITH ANGLED MOMENT BAR FOR PRE-LOAD ADJUSTMENT

(71) Applicant: Hall Logic, Inc., Provo, UT (US)

(72) Inventors: Michael Hall, Provo, UT (US); David R. Hall, Provo, UT (US); Thomas Corie, Springville, UT (US); Dallin Clawson, Spanish Fork, UT (US); Jeffery Duncan, Tucson, AZ (US); Justen Hansen, Stansbury Park, UT (US)

(73) Assignee: Hall Logic, Inc., Provo, UT (US)

( * ) Notice: Subject to any disclaimer, the term of this patent is extended or adjusted under 35 U.S.C. 154(b) by 17 days.

(21) Appl. No.: 17/412,221

(22) Filed: Aug. 25, 2021

(65) Prior Publication Data
US 2023/0067702 A1 Mar. 2, 2023

Related U.S. Application Data

(60) Provisional application No. 63/070,459, filed on Aug. 26, 2020.

(51) Int. Cl.
*B60D 1/24* (2006.01)
*B60D 1/46* (2006.01)
(Continued)

(52) U.S. Cl.
CPC ............ *B60D 1/247* (2013.01); *B60D 1/065* (2013.01); *B60D 1/345* (2013.01); *B60D 1/465* (2013.01)

(58) Field of Classification Search
CPC .......... B60D 1/247; B60D 1/065; B60D 1/30; B60D 1/465
See application file for complete search history.

(56) References Cited

U.S. PATENT DOCUMENTS

| 3,814,463 A | * | 6/1974 | Tunesi | ...................... B60D 1/32 |
| | | | | 280/455.1 |
| 3,900,212 A | * | 8/1975 | Ewing | .................... B60D 1/345 |
| | | | | 280/492 |

(Continued)

*Primary Examiner* — Jacob B Meyer
*Assistant Examiner* — Hosam Shabara

(57) ABSTRACT

A weight distribution hitch system comprising a vehicle attachment member comprising a forward end configured to rigidly attach to a vehicle, and a rearward end extending rearwardly toward a trailer, the rearward end comprising an upper portion comprising a trailer attachment member configured to pivotally attach to a coupler of the trailer, and a lower portion configured to receive a moment bar; a tension member comprising a top end configured to be supported by a frame member of the trailer, and a bottom end, and a moment bar, the moment bar comprising a first end configured to either be attached the lower portion of the rearward end of the vehicle attachment member or to be supported by the bottom end of the tension member, a second end also configured to either be attached to the lower portion of the rearward end of the vehicle attachment member or to be supported by the bottom end of the tension member, a first major face configured to face either generally upward or generally downward, a second major face opposite the first major face and also configured to face either generally upward or generally downward, and a bend between the first end and the second end; wherein, when the tension member is in tension, it imposes an upward force on the end of the moment bar that is supported by the tension member, which, in turn, imposes a forward moment on the vehicle; and wherein a preload on the moment bar is varied depending on whether the first major face faces generally upward or generally downward is disclosed.

17 Claims, 18 Drawing Sheets

(51) Int. Cl.
  *B60D 1/06* (2006.01)
  *B60D 1/34* (2006.01)

(56) References Cited

U.S. PATENT DOCUMENTS

| | | | | |
|---|---|---|---|---|
| 4,230,333 | A * | 10/1980 | Persyn | B60D 1/345 |
| | | | | 280/406.2 |
| 8,328,222 | B1 * | 12/2012 | Roeber | B60D 1/247 |
| | | | | 280/406.1 |
| 11,046,131 | B2 * | 6/2021 | McCall | B60D 1/58 |
| 2022/0332155 | A1 * | 10/2022 | Draper | B60D 1/247 |

* cited by examiner

Prior Art

Prior Art

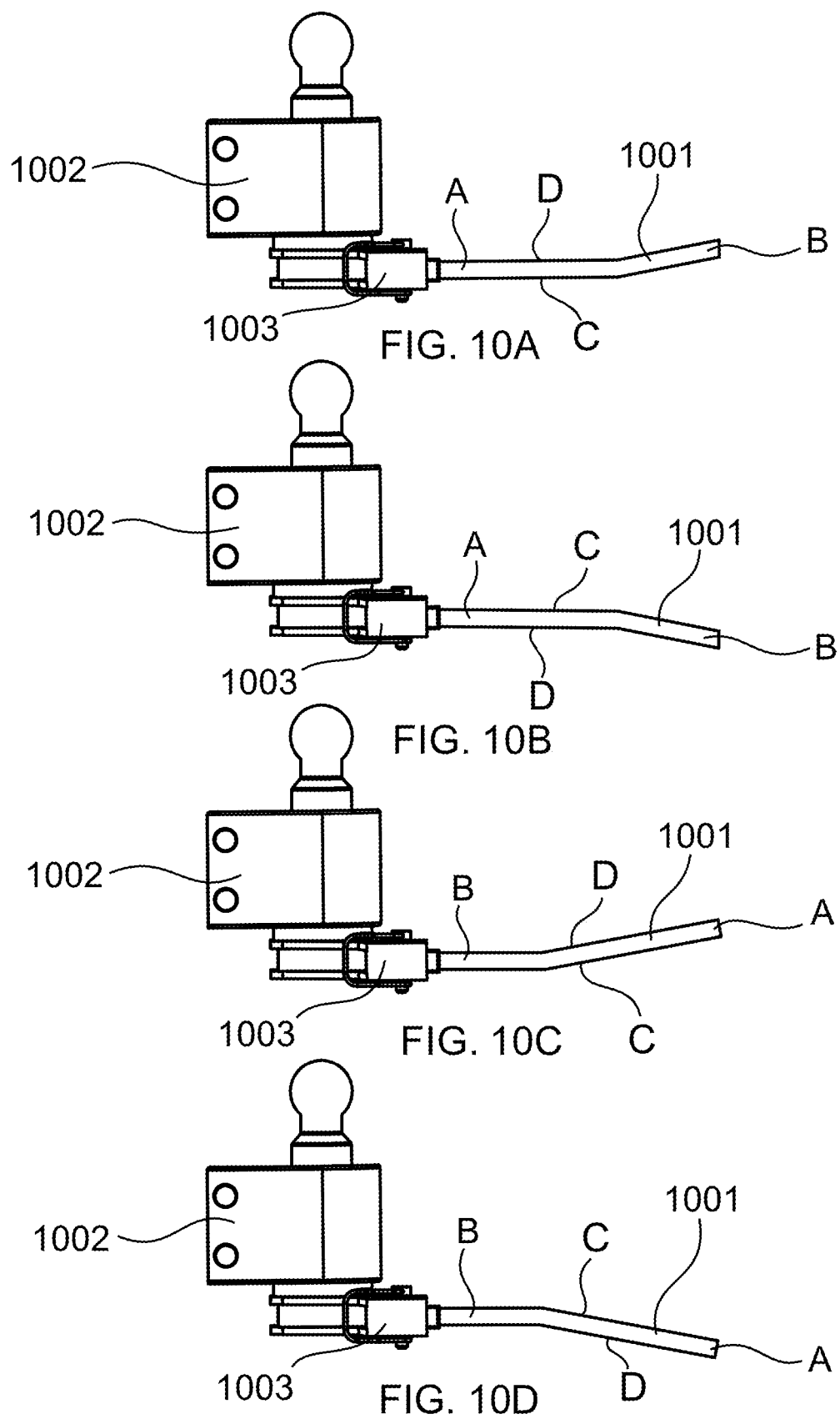

WEIGHT DISTRIBUTION HITCH WITH ANGLED MOMENT BAR FOR PRE-LOAD ADJUSTMENT

CROSS-REFERENCE TO RELATED APPLICATIONS

This application claims the benefit under 35 U.S.C. 119(e) of U.S. Provisional Patent Application No. 63/070,459 titled "Weight Distribution Hitch with Angled Moment Bar for Pre-Load Adjustment" filed on 26 Aug. 2020, which disclosure is incorporated herein by reference in its entirety.

TECHNICAL FIELD

The present disclosure relates to trailer hitches. More particularly, it relates to trailer hitches equipped with weight distribution systems.

BACKGROUND

A typical trailer hitch connects to a vehicle near its rear bumper. When the trailer is connected, the downward load from the trailer tongue on the hitch can cause the vehicle to squat, putting extra load on the rear axle and lessening the load on the front axle. This can reduce the traction of the front tires and can cause the headlights to point upward. Equalizer hitches can prevent these problems by using spring bars to exert a moment on the vehicle, which shifts the resulting load of the trailer tongue toward the center of the vehicle, eliminating the squat. However, equalizer hitches require tedious setup and are not easily adjusted. Changes to the tow vehicle, the trailer, or the load carried by the trailer may require readjustment. These adjustments take time and may require special tools. Because of this, users may either fail to adjust or adjust incorrectly. Accordingly, a hitch that is easier to set up and adjust is desirable.

One hazard associated with towing heavy loads is sway, also known as fishtailing. Trailer sway occurs when lateral forces develop causing the trailer to move side to side. Sway is a major cause of accidents. An improved sway control hitch system that is effective and easy to setup and use is needed.

SUMMARY

In a first aspect, the disclosure provides a weight distribution hitch system comprising a vehicle attachment member comprising a forward end configured to rigidly attach to a vehicle, and a rearward end extending rearwardly toward a trailer, the rearward end comprising an upper portion comprising a trailer attachment member configured to pivotally attach to a coupler of the trailer, and a lower portion configured to receive a moment bar; a tension member comprising a top end configured to be supported by a frame member of the trailer, and a bottom end, and a moment bar, the moment bar comprising a first end configured to either be attached the lower portion of the rearward end of the vehicle attachment member or to be supported by the bottom end of the tension member, a second end also configured to either be attached to the lower portion of the rearward end of the vehicle attachment member or to be supported by the bottom end of the tension member, a first major face configured to face either generally upward or generally downward, a second major face opposite the first major face and also configured to face either generally upward or generally downward, and a bend between the first end and the second end; wherein, when the tension member is in tension, it imposes an upward force on the end of the moment bar that is supported by the tension member, which, in turn, imposes a forward moment on the vehicle; and wherein a preload on the moment bar is varied depending on whether the first major face faces generally upward or generally downward.

Further aspects and embodiments are provided in the foregoing drawings, detailed description, and claims.

BRIEF DESCRIPTION OF THE DRAWINGS

The following drawings are provided to illustrate certain embodiments described herein. The drawings are merely illustrative and are not intended to limit the scope of claimed inventions and are not intended to show every potential feature or embodiment of the claimed inventions. The drawings are not necessarily drawn to scale; in some instances, certain elements of the drawing may be enlarged with respect to other elements of the drawing for purposes of illustration.

FIGS. 10A-10D are side views of an embodiment of a bent moment bar according to the present disclosure attached to a weight distribution hitch in four different configurations.

DETAILED DESCRIPTION

Definitions

Figure 1A:
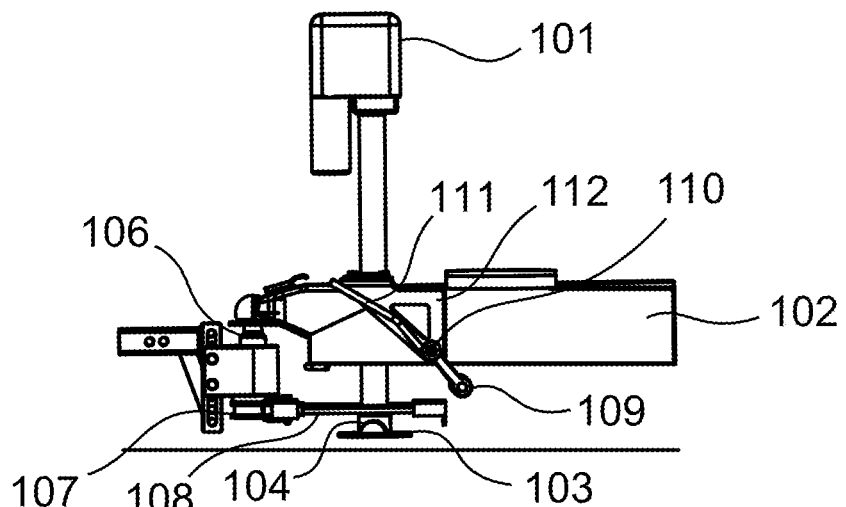
FIG. 1A is a side elevation of a first embodiment of a weight distribution hitch in an unloaded position according to the present disclosure.

The following terms and phrases have the meanings indicated below, unless otherwise provided herein. This disclosure may employ other terms and phrases not expressly defined herein. Such other terms and phrases shall have the meanings that they would possess within the context of this disclosure to those of ordinary skill in the art. In some instances, a term or phrase may be defined in the singular or plural. In such instances, it is understood that any term in the singular may include its plural counterpart and vice versa, unless expressly indicated to the contrary.

As used herein, the singular forms "a," "an," and "the" include plural referents unless the context clearly dictates otherwise. For example, reference to "a substituent" encompasses a single substituent as well as two or more substituents, and the like.

As used herein, "for example," "for instance," "such as," or "including" are meant to introduce examples that further clarify more general subject matter. Unless otherwise expressly indicated, such examples are provided only as an aid for understanding embodiments illustrated in the present disclosure and are not meant to be limiting in any fashion. Nor do these phrases indicate any kind of preference for the disclosed embodiment.

As used herein, "hitch" is intended to have a broad meaning, referring to the hardware connecting a vehicle to a trailer including but not limited to a hitch receiver, a hitch shank, a hitch extension, a hitch head, a ball mount, a ball, and spring bars or moment bars, as context requires. It may also be used more specifically to refer to the piece that mounts underneath the vehicle, typically with bolts or welding, and contains the receiving hole for the hitch shank, as context requires.

As used herein, "shank," or "hitch shank," refers to the piece of the system which generally slides into a hitch receiver and extends toward a trailer. In some cases, a shank is also the ball mount.

As used herein, "head," or "hitch head," refers to the piece of the system generally found between a shank and a hitch ball. In some cases, a hitch head also receives moment bars.

As used herein, "forward" means toward the front of a vehicle, or the direction a vehicle travels when it is in drive and the steering wheel is in a neutral position. It also may refer to a portion of an object that faces that direction.

As used herein, "rearward" means the direction a car travels when it is in reverse and the steering wheel is in a neutral position. It also may refer to a portion of an object that faces that direction.

As used herein, "longitudinal axis" in the context of a vehicle/trailer system, is defined by a line extending from the front of a vehicle to the rear of the vehicle, through the centerline of the vehicle, and parallel to the ground. In the context of a single body, it may refer to the axis which goes through the center of the longest dimension of that body.

As used herein, "lateral axis" is orthogonal to the longitudinal axis and parallel to the ground.

As used herein, "vertical axis" is orthogonal to both the longitudinal axis and the lateral axis, or, in other words, straight up and down. Vertical axis may also apply to an axis which is not exactly straight up and down but is less than 15 degrees off.

As used herein, "centerplane" refers to a vertical plane on the centerline of a vehicle or trailer from front to back.

As used herein, "forward moment" means a twisting force that would tend to tilt the front of a vehicle down and the rear of the vehicle up.

As used herein, "moment bar," synonymous with "spring bar," refers to an elongated member that translates a force into a moment on the vehicle.

As used herein, "attachment member" means the component of a weight distribution hitch on the vehicle side that mounts to the final connecting pieces which attach to the trailer, typically the ball mount or hitch head.

As used herein, "kinematic link" or "kinematic linkage" refers to a resistant body that constitutes part of the machine, connecting other parts which have motion relative to it, containing multiple joints connecting parts that move relative to each other.

As used herein, "effective pivot point" or "effective point of rotation" and similar phrases refer to a hypothetical fixed point of rotation that would achieve the same rotational effect as the kinematic linkage. The effective pivot point of a system may vary as the angle between the trailer and tow vehicle changes. The location of the effective pivot point is defined by its distance from the hitch ball.

Exemplary Embodiments

The present disclosure relates to hitch systems. More particularly, it relates to sway control and weight distribution hitch systems that can be easier to attach and adjust, safer to operate, provide improved sway control, and/or dampen porpoising among other improvements.

Conventional trailer hitches typically consist of a ball/coupler arrangement, wherein a ball is attached to a tow vehicle, the coupler is attached to a trailer, and the ball fits inside the coupler to create a pivotal connection. This arrangement allows forces to be transferred between the vehicle and the trailer in the longitudinal, lateral, and vertical directions but does not allow any moments to be transferred. One problem with this arrangement is that the downward force from the coupler to the ball can overload the rear axle of the vehicle, causing it to squat. This takes weight off the front wheels, which can cause steering and/or braking issues and can also angle the headlights upward.

One way to prevent this is to use a weight distribution trailer hitch that can transfer a moment between the trailer and vehicle. A negative moment in the lateral direction, or a "forward moment," takes a load off the rear axle of the vehicle and distributes it to the front axle. This reduces the squat of the vehicle.

However, typical weight distribution hitches can be tedious to hook up and adjust. They involve many connections including multiple steps at each connection and even raising and lowering the trailer multiple times. Standard weight distribution hitches have two spring bars that extend from the back of the vehicle along the frame of the trailer. These bars are used to create a forward moment on the hitch that distributes the weight toward the vehicle's front tires. In order to do that, they are attached to the frame of the trailer under extreme stress, typically with chains. The length of the chains and/or the angle of the ball mount of the hitch must be adjusted so, when the trailer is connected, the correct moment is applied. To verify it is correct, measurements must be taken and compared to the system in an unloaded state. This is typically the distance between the front bumper and the ground. The adjustment step cannot be performed while the weight distribution hitch is connected, so everything must be disconnected each time an adjustment must be made in a tedious trial and error process. This can be often if items are being added or removed from the trailer, the vehicle, or additional trailers in a double-tow scenario. Additionally, the user typically steps over the hitch many times during each setup, which can be hazardous.

Additionally, common weight distribution hitches can face a ubiquitous problem, they are designed for flat ground. They use long moment bars, usually made of a fairly stiff material such as steel, which impose a moment on the vehicle based on the geometry at the time the bars are connected. If the geometry changes, such as driving over a hill, through a trough, and especially over bumps, the moment can change drastically. In fact, it can go from one extreme to another in an instant. If the moment is too great, it can pick the rear wheels of the vehicle off the ground creating a very dangerous situation. Conversely, it can also be dangerous if the moment drops to zero or below, such as when a vehicle goes over a sharp hill or bump, because the tension in the weight distribution system goes to zero. These momentary changes in the angle between the vehicle and the trailer caused by bumps, hills or dips are common occurrences, especially for vehicles traveling off road, such as farmers and ranchers pulling heavy machinery and vacationers pulling a camper. What is needed is a weight distribution hitch which allows for greater changes in road geometry while maintaining a proper and more stable moment on the vehicle.

The preferred embodiment of the disclosed system greatly reduces the complexity of the setup and adjustment process by reducing the number of parts, simplifying the connection process, allowing adjustments to be made without disconnecting any brackets or couplers, and by allowing a user to complete the setup on a single side of the hitch. Further, adjustments can be made without raising and lowering the trailer multiple times. Because there are no chains or chain brackets, there are fewer parts resulting in cost savings. Costs can be further reduced because many of the remaining parts can be smaller, such as the moment bar and the attachment member. The preferred embodiment can also improve safety by allowing the entire process to be completed on one side of the trailer.

The disclosed system is useful on many types of connections between a vehicle and a trailer where the trailer imposes a downward force on the rear of the vehicle, such as a ball and coupler hitch or a pintle hitch. In the preferred embodiment, a vehicle has a rear mounted hitch with a ball, and a trailer has a frame mounted coupler which latches onto the ball. In one embodiment, a hitch shank and/or a ball mount has holes in a vertical row allowing the ball to be adjustable relative to the ground. In other embodiments, the ball may be adjustable relative to the ground with other adjustable mechanisms, or it may be fixed. In one embodiment, pins or bolts may be used connect the ball mount to the hitch shank.

In a preferred embodiment, the moment bars extend from the attachment member rearward toward the trailer. In one embodiment, the moment bar is connected to the lower rear portion of the ball mount such that it may impose a moment on the vehicle about a lateral axis. The moment bar may be hingedly connected to the ball mount about a vertical axis so it can rotate side to side as the vehicle goes around corners.

In one embodiment, the hinged moment bar connection may also serve as sway control for the trailer. Rather than rotating freely, the hinged connection with the hitch ball may be resistive to being rotated, for example by promoting friction between the moment bar and the ball mount. Steel on steel is ideal in some applications of the invention because of its high coefficient of friction, but it comes with the drawback of corroding. Passive materials, which are less corrosive, such as brass, bronze, brake pad materials, and stainless steel, also may be used. Many of those materials, however, have less friction than steel. Some embodiments include replaceable wear plates, which allow a user to replace them if they become too worn.

The rearward ends of the moment bars are configured to receive an upward force.

Because the forward end is fixed on a vertical axis, the upward force on the rearward end creates a moment on the attachment member. In one embodiment of the invention, the force is created by a lifting mechanism which is secured to the frame of the trailer.

One embodiment includes a weight distribution hitch that can prevent these problems by changing the weight distribution as the vehicle travels over uneven ground. In one embodiment, a load sensor indicates a change in load as the vehicle and the trailer are on uneven ground. The load sensor may communicate wirelessly with a control unit, such as a phone or built-in processor, which may communicate with the motor on the jack to adjust accordingly. When the trailer is going over a bump or hill, the load sensor will communicate a decreased tension on the jack to the control unit which will communicate to the motor to increase tension on the jack, which will help keep the vehicle pointed level, and vice versa. Then, when the vehicle returns to flat ground, the sensor will communicate an increased tension which will result in the control unit reducing the tension in the jack to normal, and vice versa.

Moment bars are typically connected to the hitch of a vehicle at a portion of the hitch located below the ball. This process may be time consuming and involve multiple connections. In some instances, moment bars are not removable from the hitch and remain attached to the vehicle as long as the hitch is attached. This makes the hitch very heavy, unsightly, and also creates a potential hazard for people walking near the rear end of the vehicle, particularly when the vehicle is not attached to the trailer, who may not see the moment bars protruding from the hitch. One embodiment creates an easy to connect and disconnect moment bar apparatus to alleviate these problems.

Compliant Moment Bars

As discussed above, traditional moment bars, even though they are sometimes referred to as "spring bars," create a fairly rigid connection between the vehicle and the trailer. Further, they are designed to be set up and used on level ground (i.e., where the frame of the vehicle and the frame of the trailer are substantially parallel). Changing the geometry of the setup, (e.g., the angle between the frame of the vehicle and the frame of the trailer) after the setup is complete, could cause huge variations in the supplied moment to the hitch. This could be very dangerous. Many times, users will have to disconnect the weight distribution system before they travel over rough terrain, such as when a vacationer pulls a camping trailer on a rocky forest trail.

If a moment bar is more compliant or flexible than traditional steel bars, the connection will be safer, smoother, and more versatile. It will alleviate the need to disconnect when going over rough terrain (i.e., being subject to momentary changes in the angle between the vehicle and the trailer). It will prevent any of the vehicle wheels from losing traction by being lifted up by the weight distribution hitch during sharp changes in the road. Further, it will dampen the moment, otherwise induced in the vehicle, by preventing bumps in the road from translating from the trailer through the hitch to the vehicle.

Limitations in typical moment bars are that they are generally made of steel and are very stiff. They have a small "green zone," which is to say they have a small range of tongue weights for which they are suitable in a given position. If the tongue weight changes outside the green zone, they need to be adjusted. If they run out of adjustment room, they need to be exchanged for a different sized moment bar. The green zone may be increased by changing to a material that is more flexible than steel. Materials such as fiber reinforced polymers may be more flexible than steel and require less adjusting. The more flexible a material is, the less adjustment is needed. If a material is flexible enough, it may make the green zone big enough that no adjustment is needed for specific applications of the hitch.

For traditional steel moment bars, each adjustment increment is controlled by the tension mechanism holding it up, which is typically a chain or an adjustable bracket or something else. For a chain, the adjustment increment is the length of each chain link. For an adjustable bracket, the adjustment zone is the distance between bolt holes, which may be an inch or less. The total adjustment zone is the total amount of links the steel bars may span, or the total distance between the top adjustment bolt hole and the bottom adjustment bolt hole. The present invention allows for larger adjustment increments because the moment bars are more compliant, and because they have a larger green zone, as discussed above. The larger the adjustment increments, the less the system needs to be adjusted. In one embodiment of the invention, the adjustment increments are greater than two inches. In another embodiment of the invention, the adjustment increment is greater than three inches. In yet an additional embodiment, there is no adjustment increment because the range of deflection of the moment bar is so great that it covers the needed range for a user.

Fiber-reinforced polymer (FRP), sometimes called fiber-reinforced plastic, although plastic is a subset of polymer, is a composite material made of a matrix of polymer with one or more reinforcing fibers of a different material. The fibers are commonly glass or carbon but can be many other materials based on the desired properties, such as aramid or other synthetic fibers or paper and other natural fibers. The polymer matrix can also be made from a variety of materials, including polyesters, vinyl esters, epoxies, or other synthetic polymers, or from naturally occurring polymers such as shellac or rubber. FRP contains the best properties of the polymer, such as corrosion resistance, flexibility, and manufacturability, with the best properties of the fiber, such as stiffness and strength, to make a composite that has properties a single material typically does not have. As such, its uses span many industries, such as marine, aerospace, tools, automotive, and construction.

The most common fiber used in FRP is fiberglass, which uses one of many glasses as the fiber in the polymer matrix. Common glass fibers are A-glass, which is widely available and inexpensive, C-glass, known for chemical resistance, E-glass, widely used because of its balance between performance and cost, ECR-glass, known for acid corrosion resistance, R-, S-, or T-glass, which are different trade names for the same material, known for having a higher tensile strength. There are many other glass fibers, some of which have a general purpose and others that are used for very specific purposes, such as AR-glass, which is useful in concrete applications because of its resistance to alkali. In addition to the different materials, glass fibers are also categorized by their form. Some common forms are veil mats, which are continuous strands of fibers in thin piles, woven fabrics, which are oriented in two directions, and chopped strand mats which are arranged randomly.

Another common FRP is carbon fiber reinforced polymers (CFRP). CFRP also contain many variations in structure and properties, although most are stronger but less flexible than fiberglass. CFRP is also usually lighter than fiberglass. CFRP is generally more expensive than fiberglass, however, its cost has been decreasing as its use in industry becomes more prevalent.

Basalt reinforced polymers are relatively new compared to fiberglass but show some advantages. Its flexibility is comparable to fiberglass while being stronger and having better impact resistance. It is more expensive than the widely used E-glass but less expensive than others, such as S-glass, and its price continues to fall as the industry is developed, which will make it a strong candidate for use in the present invention.

FRP presents many benefits over materials traditionally used for moment bars. In fact, moment bars are predominately made from steel, which is a relatively stiff material, and may suffer from corrosion and fatigue. FRPs are much more compliant, or flexible, which offers many benefits in a moment bar application. FRPs have been shown to have high fatigue strength in the direction of the fibers. Compliancy reduces the amount of jolt a rider may feel when a trailer goes over a bump. It also provides benefits concerning adjustment, such as increasing the useful distance between adjustment levels. In fact, in some embodiments of the invention, the useful range of deflection is so big that no adjustment is needed.

Figure 19:
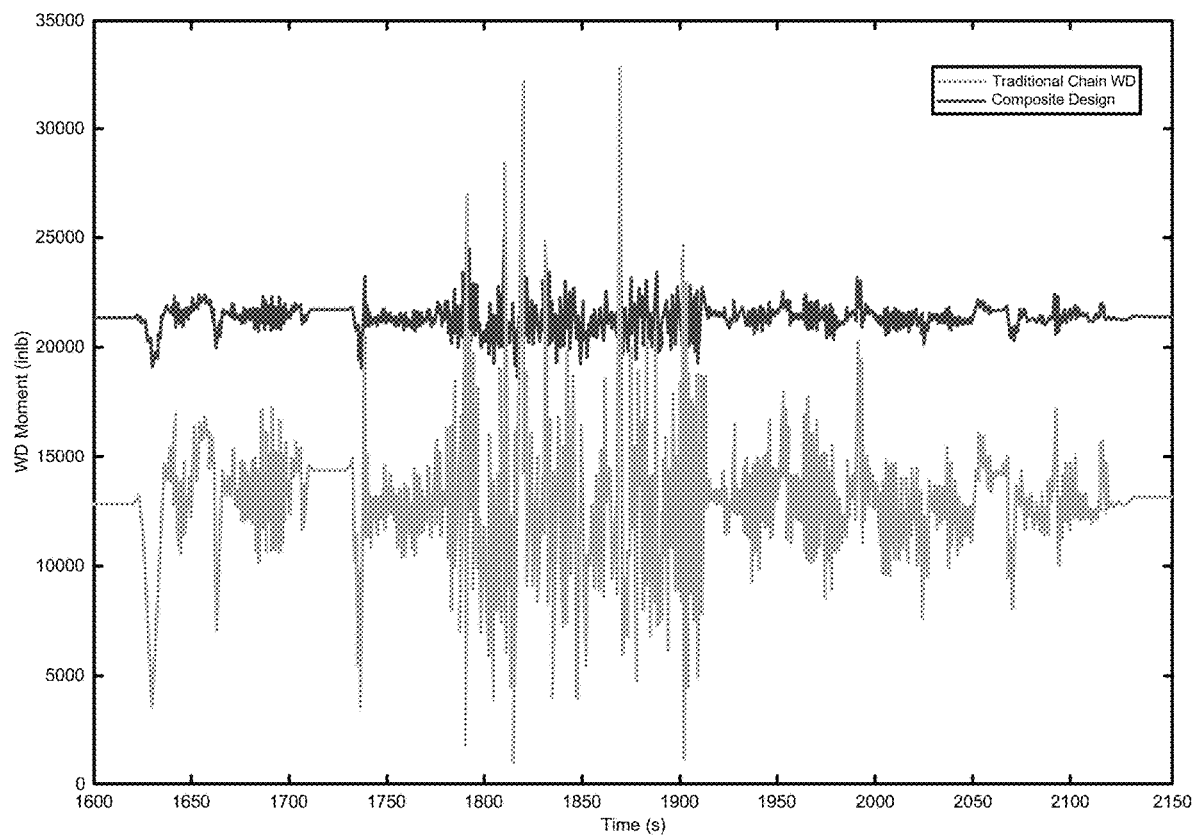
FIG. 19 is a graph showing moment over time comparing a traditional weight distribution hitch vs. one with a composite moment bar.

Compliancy or flexibility of the moment bar may be determined by the modulus of elasticity of the material or the flexural modulus of the material. The modulus of elasticity, or Young's modulus, is the resistance of a material to being deformed. The modulus of elasticity of a typical steel is 29,000 ksi (thousand pounds per square inch). By contrast, the modulus of elasticity of a typical fiberglass reinforced polymer ranges from around 10,000 ksi to 15,000 ksi. It can vary considerably depending on the materials and size and disposition of the fibers. Carbon fiber reinforced plastics commonly have a modulus of elasticity between 14,000 ksi and 85,000 ksi, although that may be reduced for more flexible applications. Preferably, the modulus of elasticity of the moment bars is less than 15,000 ksi. Even more preferably, the modulus of elasticity of the moment bars is less than 13,000 ksi. The flexural modulus is similar to the modulus of elasticity but is more specific to bending. FIG. 19 shows test data for a fiberglass that may be used in an embodiment of the invention, showing an average flexural modulus test result of 4.67 ksi.

The lower the modulus of elasticity of the moment bar is, the more dampened the moments will be, which means sudden or momentary changes in the angle between the vehicle and the trailer will translate less energy through the weight distribution hitch. For example, if the wheels of a trailer hit a bump which raises the trailer, a traditional moment bar will resist allowing the trailer to move up relative to the vehicle, so the rear of the vehicle will also be raised. With a more compliant moment bar, the trailer will be allowed to raise up while the moment bar bends with it, allowing the vehicle to remain level. This dampening effect is especially noticeable when the vehicle is pulling the trailer over a bumpy road. A compliant weight distribution hitch system allows the position of the vehicle to be less dependent on the trailer. Moment bars made from a modulus of elasticity less than 15,000 ksi provide a substantial dampening effect over steel moment bars. In one embodiment of the invention, the moment bars have a modulus of elasticity of less than 14,000 ksi, which provides even better dampening.

Compliancy or flexibility may also be determined by the spring constant (k) of the moment bar, which is the relationship between the force applied to the end of the moment bar and vertical distance it moves due to the force. The spring constant is dependent on the flexibility of the material and also the length. The shorter the bar is, the higher the spring constant will be because there is less material to flex. For example, a bar that is identical to another bar but is only one third the length will have a spring constant nine times higher than the longer bar. The spring constant for a traditional moment bar made out of steel can be over 700 lbs/inch per bar, or 1400 lbs/inch for a set of two. Even though, in some embodiments of the current invention, the moment bar is about one third the length of a traditional steel bar, the spring constant is less than 800 lbs/in. For a set of two compact moment bars with rearward ends that reach near the rear side of the jack, the spring constant is preferably less than 1000 lbs/in. Even more preferably, the spring constant is less than 900 lbs/in. Yet even more preferably, the spring constant is less than 800 lbs/in.

Another benefit of a compliant moment bar is that since the deflection of a composite moment bar can be greater than a steel bar, it can remain loaded during most of or all driving conditions. In some cases, steel moment bars may become unloaded while driving, most notably, when the vehicle goes over a hill. Each time the bars become unloaded and reloaded, the bars "cycle," so to speak, which fatigues the bars. Compliant bars can be loaded to a greater deflection, which allows the vehicle to go over even the sharpest of hills without becoming unloaded and preventing cycling altogether.

Yet another benefit of the invention is the moment bars are a material that is compliant enough to allow the geometry (i.e., the angular relationship between the vehicle and the trailer) to change without reducing the traction of the vehicle's rear wheels. When a vehicle or trailer goes over a bump or the angle between the vehicle and the trailer changes, an extreme moment can result on the vehicle. Because traditional steel moment bars are so stiff, a small change in geometry can result in a substantial moment. For example, a deflection in the end of the moment bar of 1 inch can cause a moment of 3500 ft*lbs. See FIG. 13. Compare that to a deflection of 1 inch of a compliant moment bar, which may produce a moment of 620 ft*lbs. See FIG. 14. See also FIGS. 5 and 6 for a depiction of how even though the moment bar may not deflect relative to the trailer frame to which it is braced, it is deflecting relative to its unbraced position. If a vehicle with traditional moment bars drives through a dip or turns from a level road to an inclined road, the change in geometry will cause an extreme forward moment, which will lift the rear end of the vehicle. See FIG. 4 for an example of a truck turning up a hill, which causes the front of the truck to be extremely compressed and the rear of the truck to be lifted. In extreme cases, the rear wheels can even be lifted off the ground causing the truck to lose all traction from its rear wheels. This can be extremely dangerous. However, if this same vehicle had more compliant moment bars, the bars could produce a fraction of the increased moment, making the turn safer.

One material that has proved useful as a compliant moment bar is Corvette leaf spring fiberglass composite. Fiberglass reinforced polymer has been used for leaf springs in Corvettes for decades, which decreases weight of the vehicle while maintaining a smooth ride. U.S. Pat. No. 3,968,958 discloses the benefits of using composites in leaf springs and methods of fabrication and is hereby incorporated into this application in its entirety.

In the most preferred embodiment, a section of a Corvette leaf spring is simply cut to the desired length. Preferably, an endcap is placed at or near the end of the moment bar to prevent point stresses that could damage a composite. The endcap may be metal or another material that can withstand high point loads and spread the force out over a larger area of the moment bar. In some embodiments, the end cap rests on a bracket or other tension member during use, and may be configured to slide to allow for changes in geometry. In other embodiments, the end cap latches to the tension member.

Figure 11A:
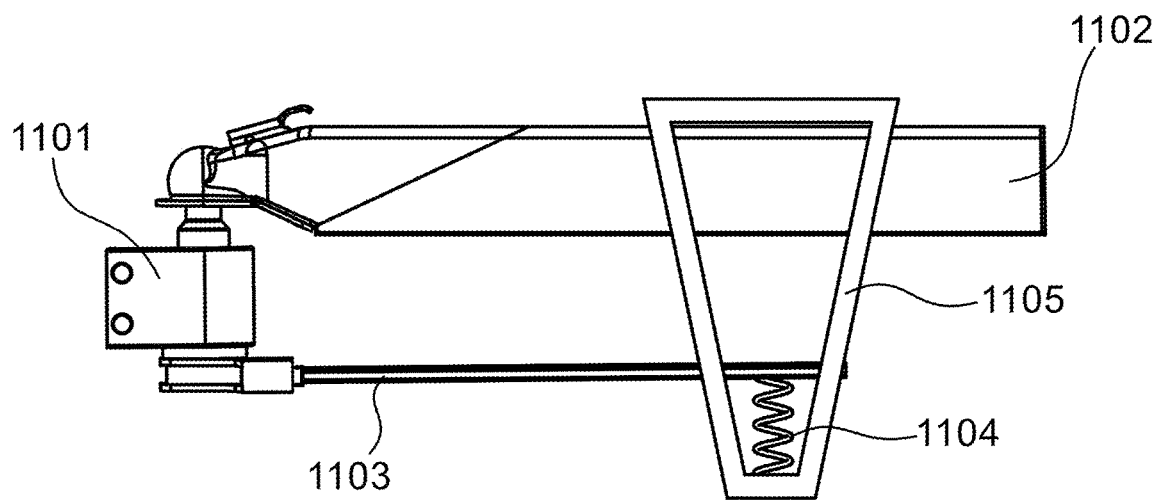
FIGS. 11A and 11B are side views of a third embodiment of a weight distribution hitch with a spring according to the present disclosure.
Figure 11B:
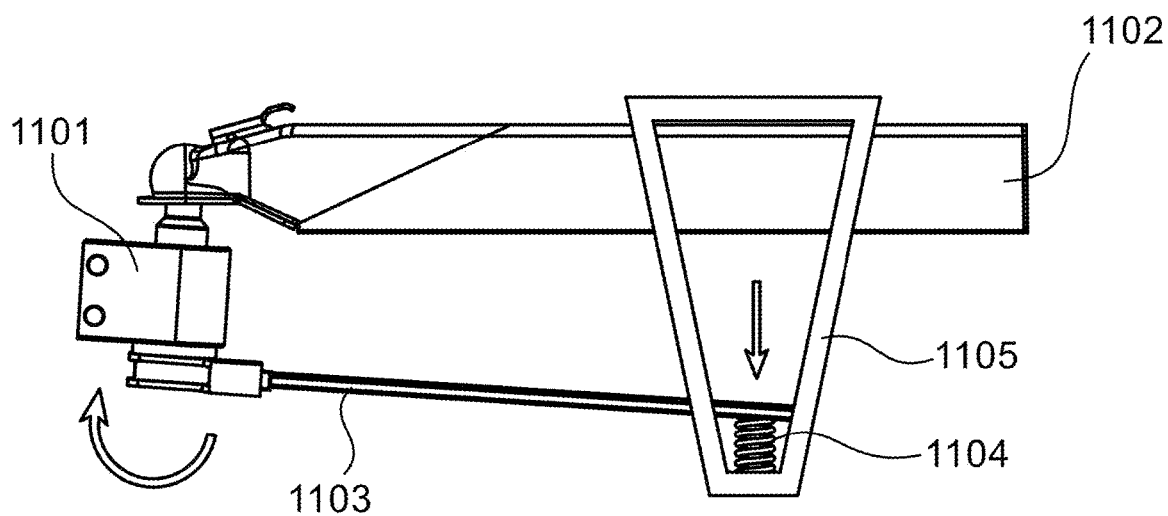

Alternatively, compliance in the system may be achieved with a stiffer moment bar, such as steel, by using a spring to bias the moment bar toward the trailer frame member. In one embodiment of the invention, a moment bar connects to the tension member on one or more springs, as shown in FIGS. 11A and 11B. The spring allows the moment bar to have a greater range of deflection than a stiff moment bar would have by itself.

Figure 12A:
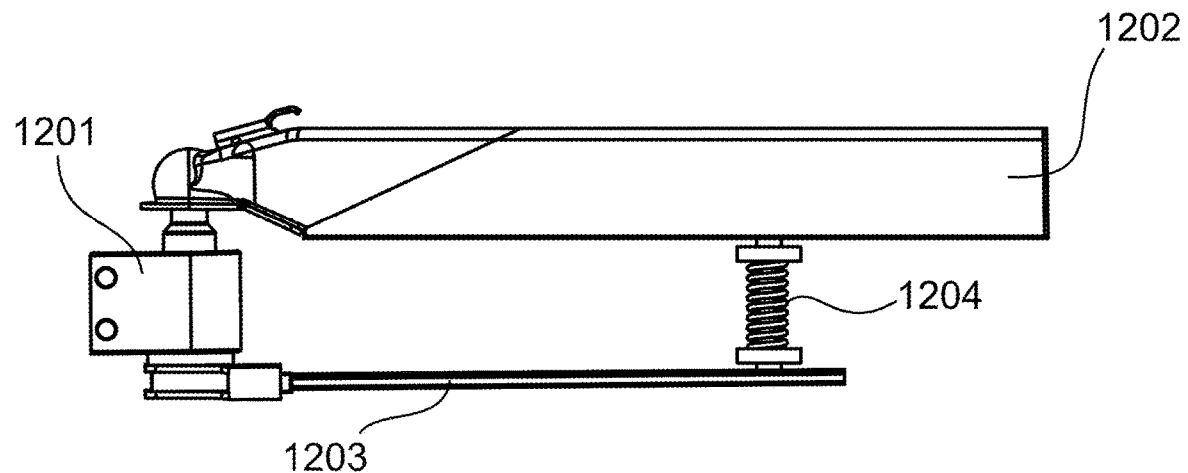
FIGS. 12A and 12B are side views of a fourth embodiment of a weight distribution hitch with a spring according to the present disclosure.
Figure 12B:
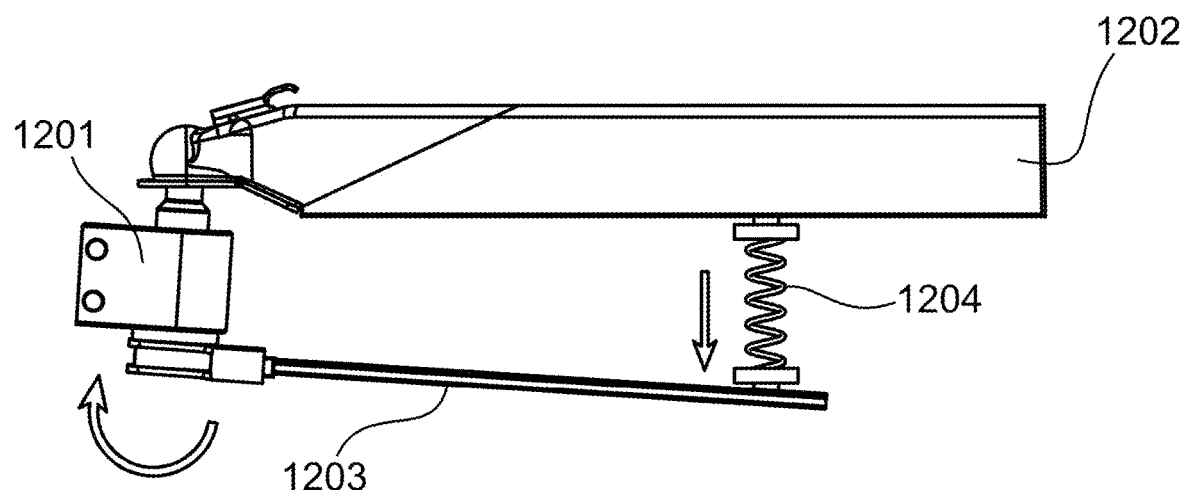

Alternatively, the tension member itself could be a spring, as shown in FIGS. 12A and 12B. In each case, the springs would create a similar effect as a compliant moment bar, creating a smoother, safer, and more versatile connection than a traditional weight distribution hitch. In an embodiment of the invention using springs, the moment bar is flexible, which contributes to the overall compliancy of the system.

Figure 13A:
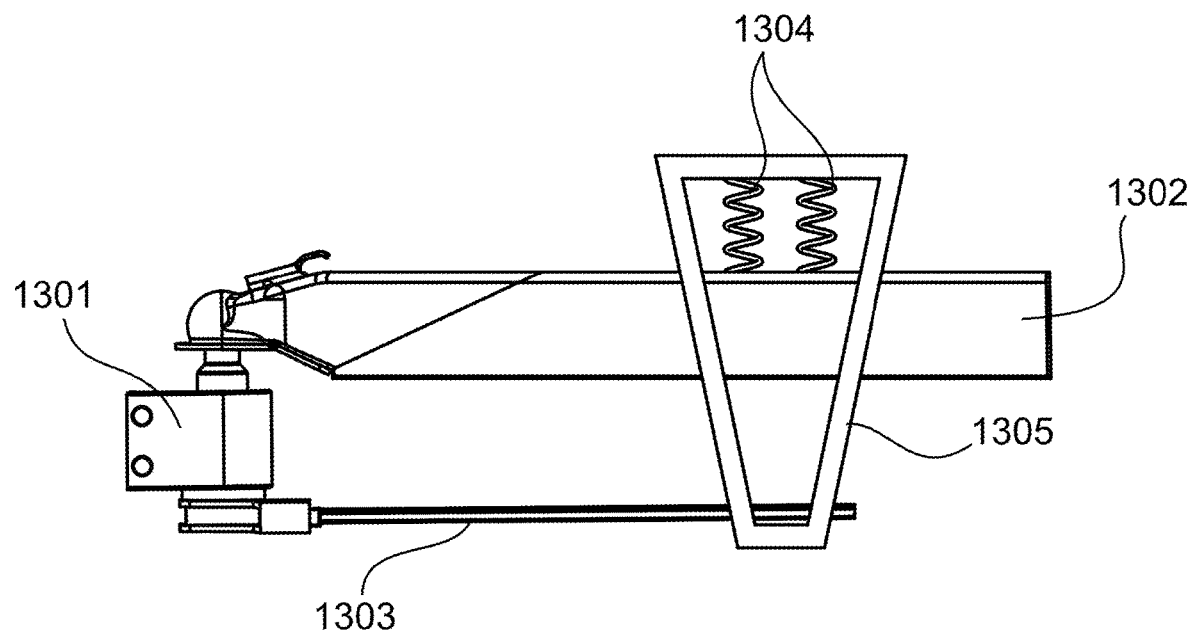
FIGS. 13A and 13B are side views of a fifth embodiment of a weight distribution hitch with a spring according to the present disclosure.
Figure 13B:
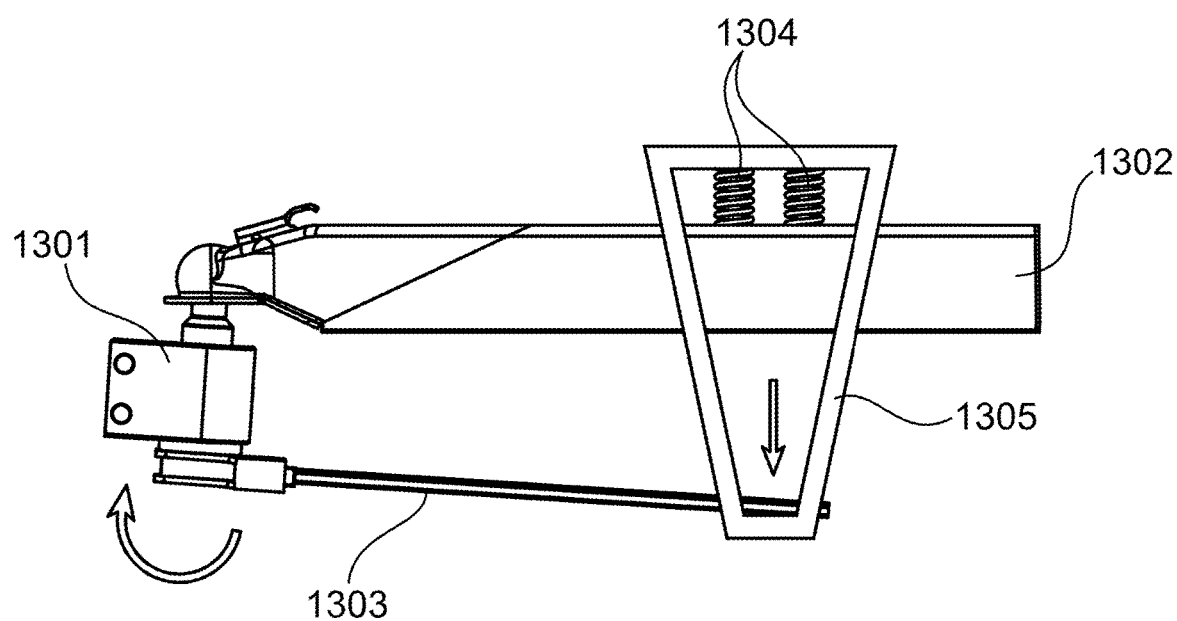

Alternatively, the tension member itself could be attached to the trailer frame member through one or more springs, as shown in in FIGS. 13A and 13B.

In another embodiment of the invention using springs, the moment bar is stiff, and the springs provide all the compliancy of the system. In that embodiment, the preloading mechanism, such as a jack can be used to preload the system by lifting on the moment bar and causing a moment, which will tilt the angle of the vehicle, which will raise the rearward end of the moment bar above the lifting surface of the tension member.

Compact Moment Bars

One benefit of the invention is the moment bars can be compact (i.e., much shorter than traditional moment bars), which decreases the vertical displacement needed to load the bar. Or, alternatively, a shorter moment bar allows for a more compliant material, which can allow for a similar vertical displacement to load the bar as a steel bar but with the added benefits of moving the connection forward, using alternative materials, and the cost savings of having a shorter bar. Traditional moment bars are typically between 30 inches and 40 inches long. Preferably the moment bars are less than 28 inches in length and more preferably less than 24 inches in length. Still more preferably, the moment bars are between 6 inches and 20 inches long. Evan more preferably, the moment bars are between 8 inches and 15 inches long. Still even more preferably, the moment bars are between 9 and 12 inches long.

Stated another way, the compact moment bar can be seen as the ratio between the length of the moment bar "L" and the height difference "H" between where the moment bar attaches to the attachment member and the point where the trailer couples to the hitch above it. Measured this way, the ratio L/H is preferably between 2 and 6 and even more preferably between 3 and 5.

Shortening the moment bar also moves the rearward end closer to where a jack sits on a traditional trailer frame. One embodiment of the current invention allows the jack or another tensioning device to help deflect a moment bar. It may assist during setup to load the moment bar so it can be latched or otherwise supported by the trailer frame in a loaded state. Alternatively, it may hold the rearward end of the moment bar during operation. That configuration allows the system to work without additional brackets, latches, or chains to apply the moment during operation.

An additional benefit to shortening the moment bar so that the rear end of it is disposed near the jack is that the bracket for holding the moment bar during operation can be mounted to the area where the jack is mounted. Changing the configuration of a weight distribution system can be difficult in terms of mounting brackets. The frame of a trailer holds other items, such as propane tanks, batteries, and storage boxes, etc. However, most trailer frames have a standard place for a jack to mount. In one embodiment of the invention, the bracket, swing latch, or other holding device for the moment bars is attached to the frame near the location of the jack. Additionally, it may use the same bolt holes that are preconfigured for standard jacks. In one embodiment of the invention, a yolk for the holding mechanism wraps over the frame at the location of the jack, and the jack is mounted to the top of the yolk.

Further, longer moment bars can take much longer to set up and require a more hazardous process. In some cases, the user has to apply a strong force to the moment bar with a lever in order to place it in the holding bracket. The user has to do this for each side, which usually involves stepping over the hitch multiple times or walking around the front of the vehicle multiple times. Shorter moment bars mean the rearward ends of the bars are closer to the front of the trailer frame and can be reached by a user standing on a single side. Preferably, the user can attach the moment bars to the trailer with a single step. One advantage of the present invention is that rather than setting the moment bars each time, a user needs only to engage them. There is no setup.

One embodiment of the invention uses a releasable tension member, which may be a bracket, latch, or chain to hold the moment bar or bars up once they are lifted. The jack may be used to lift the moment bars to a point where the latch or bracket can mate with them in a preloaded condition, so a user does not have to do it manually.

In one embodiment, the releasable tension member is a swing latch (FIGS. 8 and 9), allowing the user to latch the moment bar with a single motion. A user may be able to engage the system by simply preloading the moment bars with a jack and then swinging the latch into position. The swing latch may be mounted to the trailer frame at a point near the rearward end of the moment bar. In one embodiment of the invention, the swing latch comprises a saddle that rests on the trailer frame. The swing latch may reach down from the saddle with bars that have a pivot allowing the one or more bars to "swing" forward and back. In one embodiment of the invention, the saddle has mounting holes which coincide with a standard jack mount. The bottom of the swing latch may comprise a bearing surface for the moment bars to rest on. In another embodiment of the invention, the swing latch comprises multiple levels of bearing surfaces to allow the moment bars to be held at different heights, causing different moments. In other embodiments of the invention, where the system is configured to not need adjustment, or to be adjusted by other means, the swing latch has a single bearing surface. Also, the swing latch may have a handle for the user to conveniently hold while engaging the swing latch. Preferably, the swing latch holds the rearward end of the moment bar near the rearward side of the jack, which is to say less than twelve inches rearward of the jack. Even more preferably, the swing latch holds the rearward end of the moment bar less than six inches from the rearward side of the jack.

Another benefit of having a compact moment bar, in combination with compliant materials, is that because compliant materials flex more, the shorter distance allows the bars to be preloaded in less vertical space. The reduced length and reduced spring rate work together. A compact bar made from steel may provide too high of a spring rate or too small of an adjustment zone to be effective. A compliant bar at the traditional length may provide too much flex, or it may need to be extremely thick to translate enough moment to the hitch. The reduced length and reduced spring rate work together to provide a moment bar that fits in a smaller space, is easier to engage, and provides all the benefits mentioned above.

The Coupler

In one embodiment of the invention, the hinged moment bar connection may also serve as sway control for the trailer. Rather than rotating freely, the hinged connection may be resistive to being rotated, for example by promoting friction between the moment bar and the ball mount. Steel on steel is ideal in some applications of the invention because of its availability and high coefficient of friction, but it comes with the drawback of corroding. Passive materials, which are less corrosive, such as brass, bronze, brake pad materials, and stainless steel, also may be used. Many of those materials, however, have less friction than steel. One embodiment of the invention includes replaceable wear plates, which allow a user to replace them if they become too worn. Alternatively, one or more springs are incorporated into the design to bias the moment bar to the neutral position (i.e., extending straight back from the ball mount). In this way, the moment arm can pivot, but that pivoting is resisted and the moment arm is biased back to the neutral position. Incorporating a resistance into the pivoting of the moment arm can help keep the trailer from swaying from side to side as the resistance inhibits the lateral movement of the trailer.

However, one of the problems with some existing weight distribution hitches is the complexity of the connection between the moment bars and the attachment member and storage of the moment bars. In many cases, the moment bars are attached to the vehicle with a pin or a series of pins that takes time to connect and disconnect. Because of this, many users store the moment bars on the hitch even when the trailer is not connected, which creates a tripping hazard. What is needed is a connection that allows the moment bar or bars to be easily connected and disconnected from the attachment member.

Figure 6:
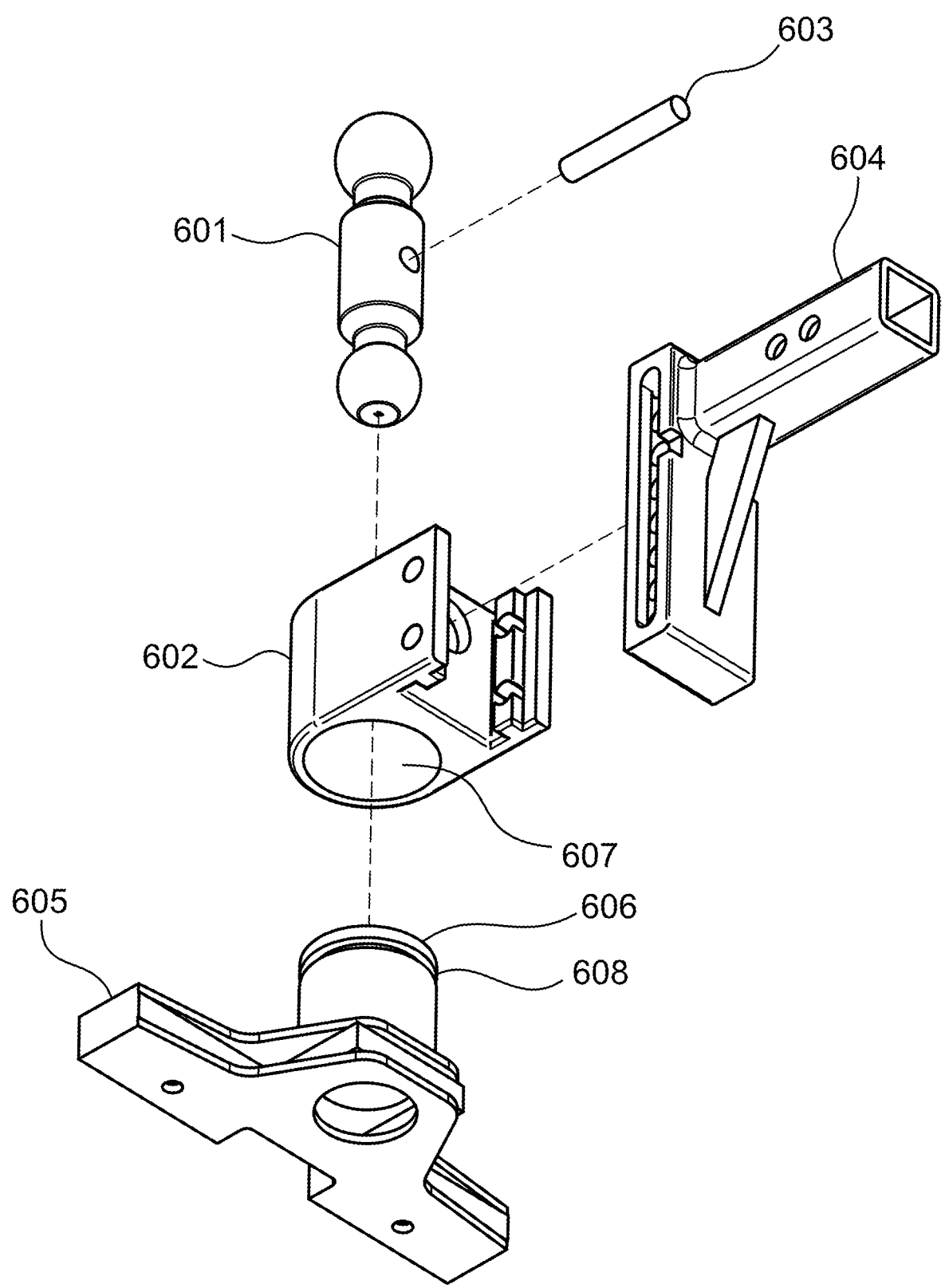
FIG. 6 is an exploded perspective view of an embodiment of a barrel coupling according to the present disclosure.
Figure 7B:
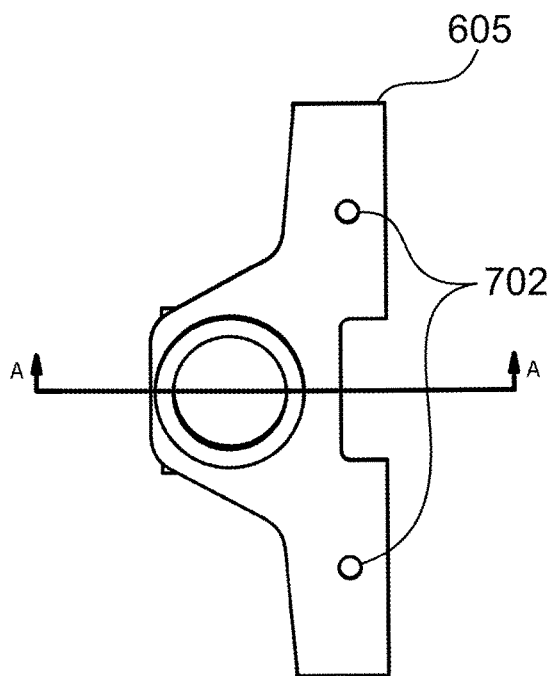
FIG. 7B is a top view of the embodiment of FIG. 6.
Figure 7A:
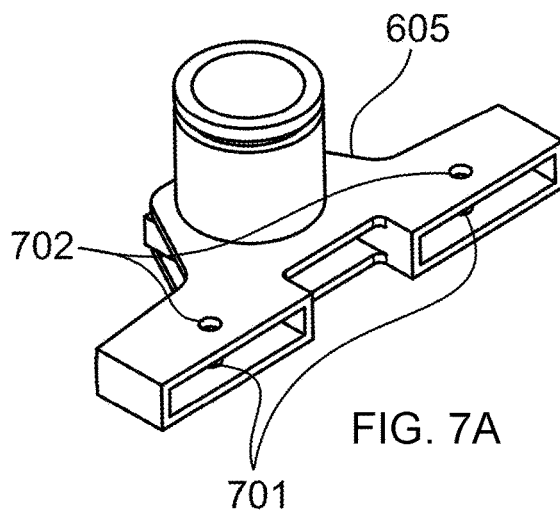
FIG. 7A is a perspective view of the embodiment of FIG. 6.
Figure 7C:
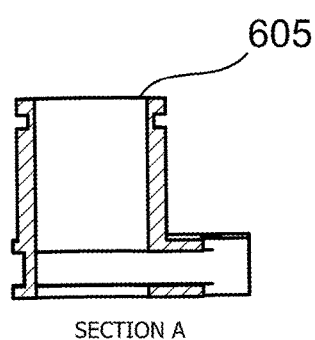
FIG. 7C is a side cross-sectional view along line A-A in FIG. 7B of the embodiment of FIG. 6.
Figure 7D:
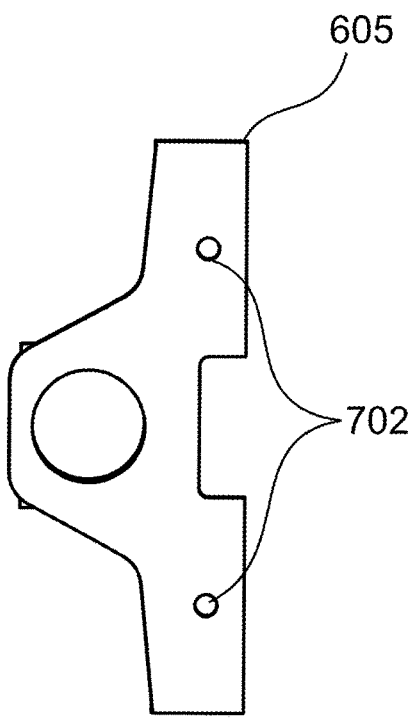
FIG. 7D is a bottom view of the embodiment of FIG. 6.
Figure 7E:
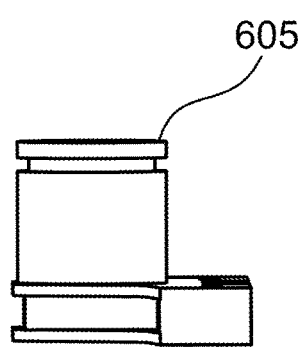
FIG. 7E is a side view of the embodiment of FIG. 6.

In one embodiment of the invention, a barrel coupling comprising nesting cylinders provides a simple connection between the hitch and the moment bars. In one embodiment, a hitch head has an outer cylinder protruding downward below the hitch ball. The connection for the moment bars comprise an inner cylinder which is inserted into the outer cylinder providing a connection which pivots about a single axis, typically the z-axis, and can translate a moment from the moment bars to the hitch head, as depicted in FIG. 6. In an embodiment of the invention, the outer cylinder comprises a horizontal groove on its inner surface allowing a spring clip on the inner cylinder to hold the inner cylinder inside the outer cylinder without falling out. In other embodiments, the groove is on the inner cylinder and a mating clip is on the outer cylinder.

The connection between the inner and outer cylinders can provide not only a moment inducing connection, but a sliding friction which may assist with sway control for the trailer. The materials and the gap between the cylinders may be varied per the needs of the system.

The size of the mating surface between the inner cylinder and the outer cylinder also affects the amount of friction in the barrel coupling and thus sway control. Preferably, the inner cylinder has a diameter of at least 2 inches. Even more preferably, the inner cylinder has a diameter of at least 2.5 inches. Yet even more preferably, the inner cylinder has a diameter of at least 3 inches. Concerning depth, the inner and outer cylinders preferably have a mating surface that is at least 1.5 tall. More preferably, the inner and outer cylinders have a mating surface that is at least 2 inches tall. Yet even more preferably, the inner and outer cylinders have a mating surface that is at least 2.5 inches tall.

Various materials provide different benefits for the sliding surface between the inner and outer cylinders. In one embodiment of the invention, both surfaces are made from steel, which is inexpensive to produce, long lasting, and also provides a higher amount of friction than many other metals. In another embodiment, a liner may be applied to one of the surfaces, which may be permanent or replaceable, which provides more or less friction. In a preferred embodiment of the invention, the liner is bronze. In another embodiment, the liner is made from brake pad material. In another embodiment, for an application requiring less friction, the liner is oil impregnated bronze. In other embodiments, the surfaces of the inner and outer cylinders are made from other metals or hard substances.

Another benefit of the present invention is that a single hitch can comprise multiple ball sizes and also be used for weight distribution. This makes it much cheaper and easier for users to pull multiple trailers that require different sizes of balls and that may or may not use weight distribution. With other hitch systems, the user may have different sizes of balls, or they may have weight distribution, but not both.

One embodiment of the present invention includes a dual coupler ball, which may be inserted through the barrel coupler previously mentioned such that one ball extends above the barrel coupler and the other ball is hidden inside the cylinder, as depicted in FIG. 6. In this embodiment, the cylinder on the moment bar may also be hollow so it does not interfere with the hidden ball. The dual coupler ball may be held in place with a removable pin that extends through the side of the hitch.

The rearward end of the moment bar is configured to receive an upward force. Because the forward end is fixed about the lateral axis, the upward force on the rearward end creates a moment on the attachment member. In most embodiments, it is preferred to impart a preload to the moment bar. In one embodiment of the invention, the upward force on the rearward end of the moment bar (i.e., the preload) is created by a lifting mechanism which is secured to the frame of the trailer. In the preferred embodiment, the lifting mechanism is a jack which has a bearing surface disposed near the bottom of a shaft that extends from the trailer frame at least as far as the moment bar. One benefit of using a jack is that it may also be used as a support for the trailer. In one embodiment of the invention, the jack is capable of being loaded in both tension and compression: tension while it is lifting or preloading the moment bar; and compression while it is supporting the trailer.

The invention also preferably includes a bearing surface on the lifting mechanism designed to allow it to lift the moment bar. In one embodiment of the invention, a jack has a bearing plate or pegs fixed to the shaft at a location at least as low as the bottom of the moment bar. In other embodiments, the bearing surface is spherical or another shape. The bearing plate may attach to the outer circumference of the shaft of a jack and surround the shaft, or it may attach to one side. In the preferred embodiment, the bearing surface of that plate is convex, which allows it to avoid point forces on the moment. In one embodiment of the invention, the moment bar has a concave surface to better mate with the convex surface of the jack.

In one embodiment of the invention, when a single moment bar is being used rather the traditional pair, the moment bar preferably also contains an aperture allowing it to go around the shaft of the jack or a portion of the jack or other lifting mechanism. This allows the bearing surface of the moment bar to surround the jack. This has many benefits. First, it allows the tension in the shaft of the jack to be axial rather than eccentric as it would if the bearing surface was only on one side of the jack. It also locks the moment bar onto the jack which allows it to be stored on the trailer rather than the vehicle. It also prevents theft. In one embodiment of the invention, the aperture is oval or an elongated slot. This gives the moment bar more movement respective to the jack than with a circular aperture, which helps a user manipulate the moment bar into and out of its installed position in the attachment member.

Although compliant moment bars provide a larger range of use than steel bars, there may be uses of the invention where different sized moment bars may be necessary. In one embodiment of the invention, the attachment member is configured to receive different sizes of moment bars, wherein larger moment bars will produce a larger moment. In another embodiment of the invention, the attachment member is configured to tilt, which projects the moment bar at different angles allowing for different values. In this case, tilting the moment bar down from the attachment member will produce a greater moment, and tilting the moment bar up will produce a lesser moment. In yet another embodiment of the invention, shims may be used to change the angle of the moment bar. The shims may be used in the connection between the moment bar and the attachment member. One version of this uses different sized shims configured for different loads. Another version uses multiple stacking shims to produce a different angle for different loads.

In yet another embodiment of the invention, larger or smaller moments are created with a curved or bent moment bar, as shown in FIG. 10. The moment bar may be reversible such that it is configured to provide one range of moments in one position and a different range of moments by flipping the moment bar over about its longitudinal axis. In yet another embodiment of the invention, the moment bar is curved or bent asymmetrically. This allows two different ranges of moment by flipping it over about its longitudinal axis and another two different ranges of moment by flipping it about its vertical axis for a total of four different ranges of moment. In this case, both ends of the moment bar may be similarly configured to mate with the attachment member in the same place.

The additional load from the lifting mechanism can be measured in many different places. It may be measured within a trailer jack, the trailer coupler, or on the hitch, as disclosed in U.S. Pat. No. 7,960,659 B2, which is hereby incorporated by reference in its entirety. It may also be measured within the ball of the hitch as disclosed in US Patent Publication No. 2006/0290102, which is hereby incorporated by reference in its entirety. The following patents are also hereby each incorporated by reference in their entireties: U.S. Pat. Nos. 9,290,185, 9,956,965, 10,142, 798, 10,214,222, 10,274,360, 10,543,846, and 10,544,725. The following US Published Patent Applications are also each hereby incorporated by reference in their entireties: US 2018/0215358, US 2018/0111619, US 2019/0152468, US 2019/0178701, US 2019/02022251, and US 2019/021418.

Figure 1B:
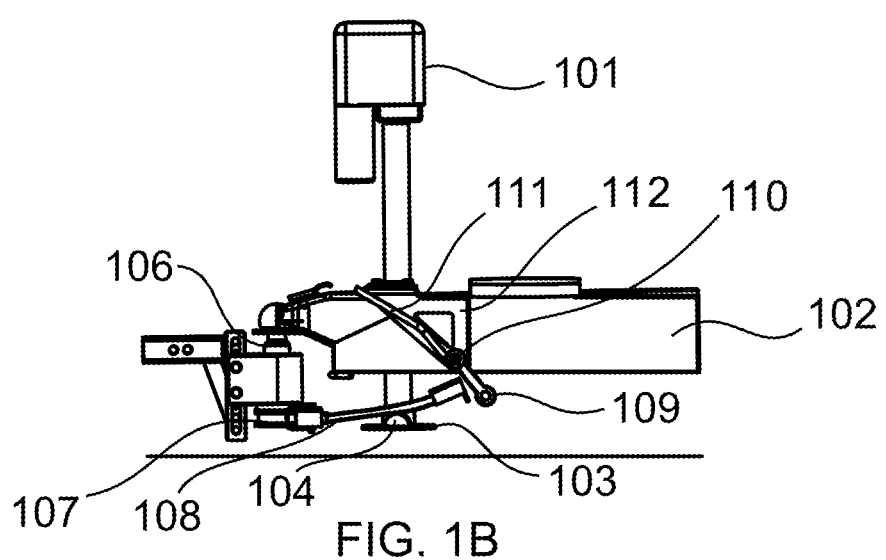
FIG. 1B is a side elevation of the first embodiment with the moment bar raised.
Figure 1C:
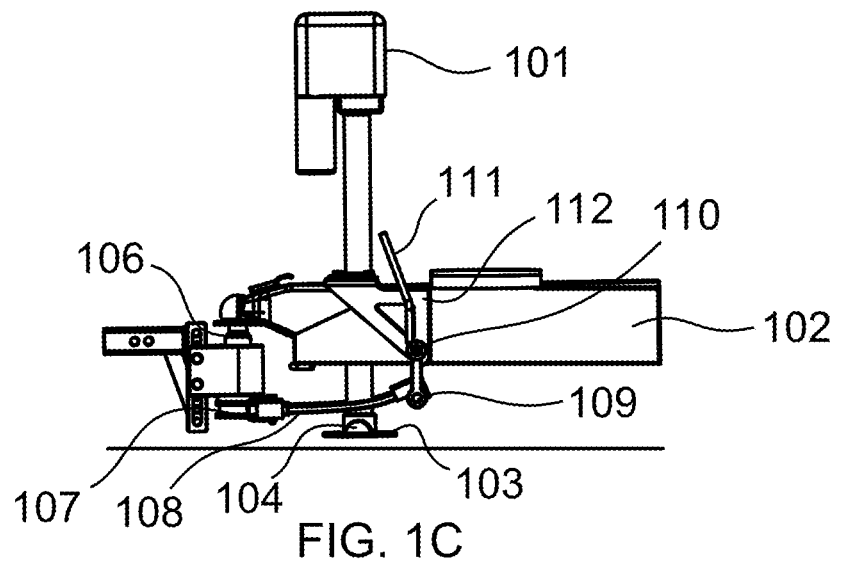
FIG. 1C is a side elevation view of the first embodiment with the bar raised and latched in place.

Now referring to FIG. 1, which shows an embodiment of a swing latch as a tension mechanism. A jack 101 with a jack foot 102 comprising lifting pegs 103 is mounted to trailer frame 104. An attachment member 105 provides a ball coupling 106 attachment for the trailer and also a moment bar coupling 107. Compliant moment bars 108 extend from the moment bar coupling 107 out over the jack foot pegs 103. A swing latch 109 comprises a hinge 110, a handle 111, and a saddle 112 for attaching to the trailer frame 104. FIG. 1A depicts a first angular position wherein the swing latch 109 is disengaged and the compliant moment bars 108 and jack 101 are in a neutral position. FIG. 1B depicts a second position wherein the swing latch 109 is disengaged and the lifting pegs 104 are lifting the compliant moment bars 108 to a preloaded position. FIG. 1C depicts a third position wherein the swing latch 109 is in a second angular position and is engaged, the compliant moment bars 108 are held by the swing latch 109, and the jack 101 has returned to a neutral position.

Figure 2:
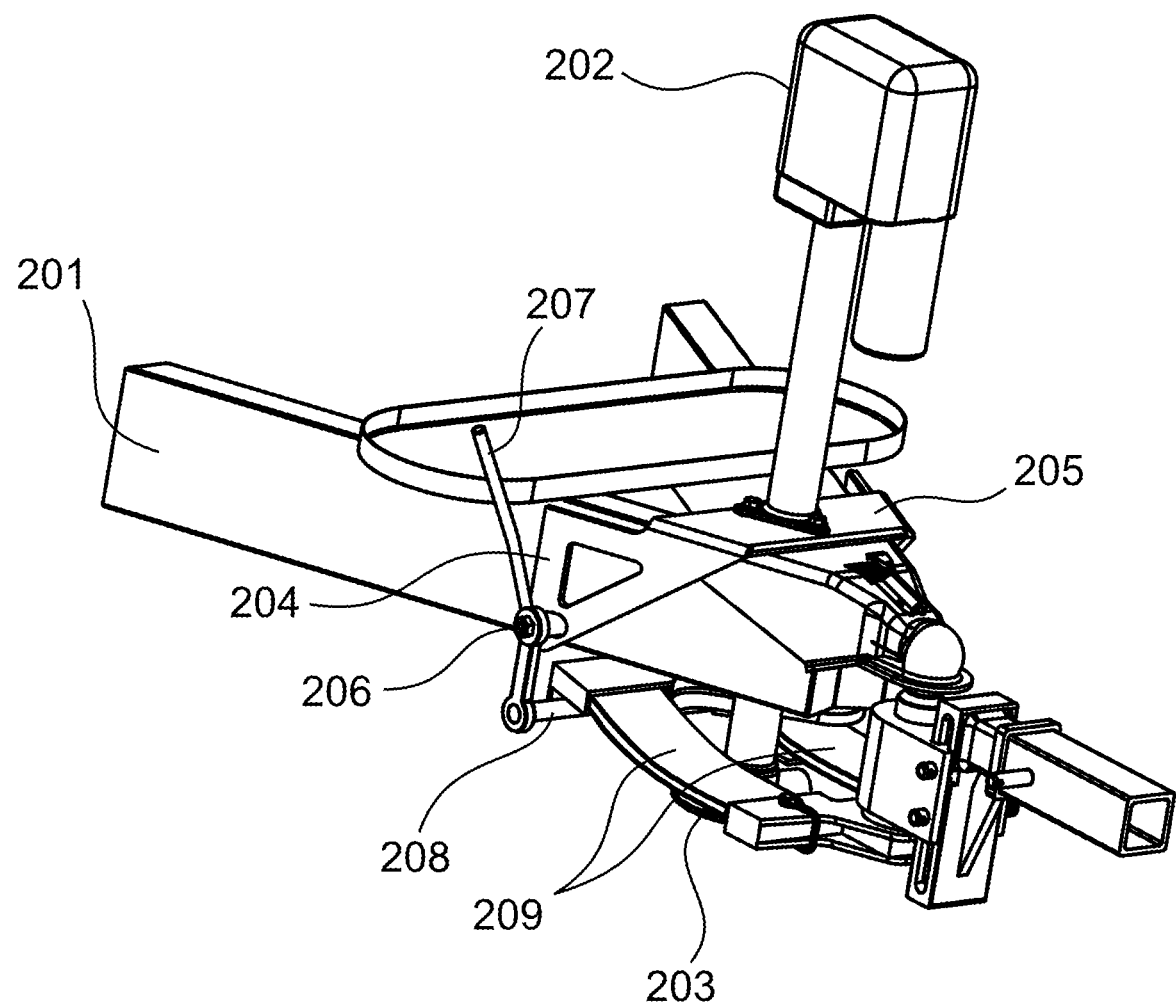
FIG. 2 is a perspective view of the first embodiment.

Now referring to FIG. 2, which shows an embodiment of swing latch as a tension mechanism. A trailer frame 201 has a jack 202 mounted to it, the jack 202 comprising a jack foot 203. A swing latch 204 comprises a saddle 205 for mounting to the top of the frame, a hinge 206, a handle 207, and a holding bar 208 for holding compliant moment bars 209 in an operating condition.

Figure 3A:
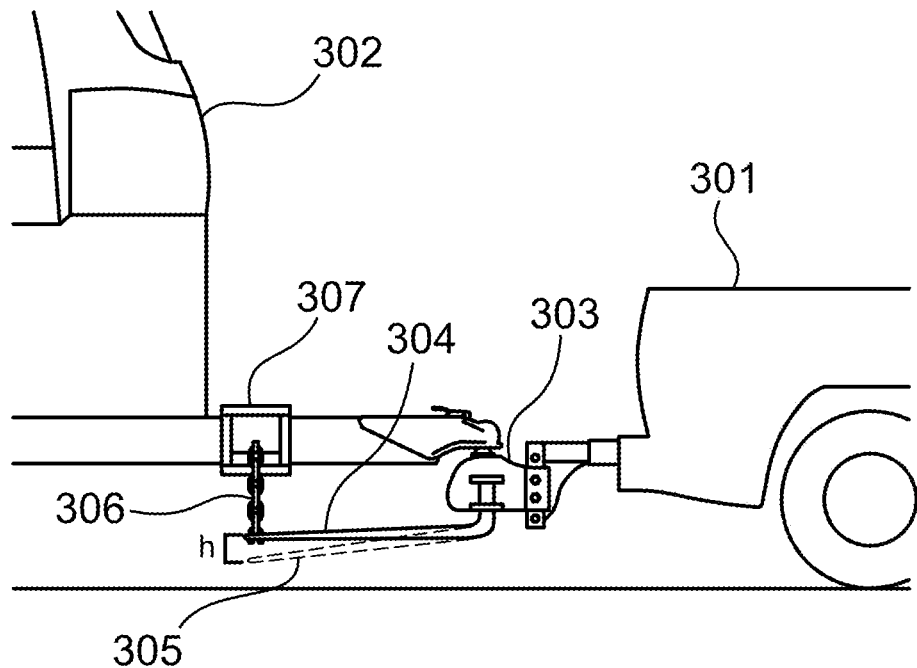
FIGS. 3A and 3B are side views of a prior art weight distribution hitch in the prior art, illustrating a change in displacement of the moment bars.
Figure 3B:
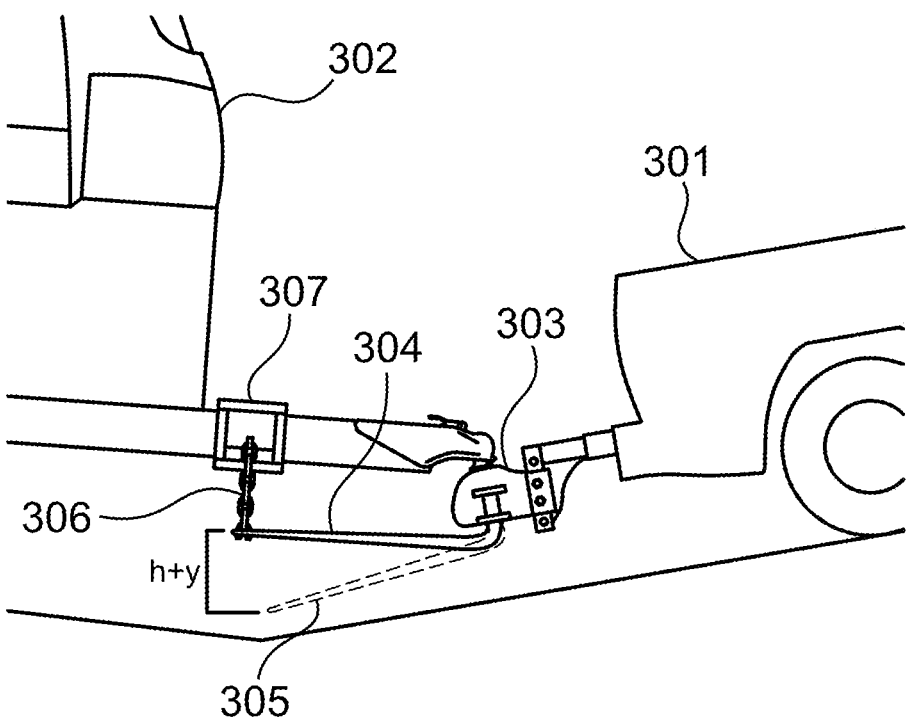

Now referring to FIGS. 3A and 3B, which depict a prior art weight distribution hitch and show the difference in deflection needed for a vehicle on flat ground vs a vehicle on a bend. A truck 301 is attached to a trailer 302 with a weight distribution hitch 303. Moment bars 304 have an undeflected position 305. The moment bars are being lifted by chains 306, which are mounted to the trailer with brackets 307. FIG. 3A shows that the distance between the undeflected position and the deflected position is equal to h when on level ground. FIG. 3B shows that the difference between the undeflected position and the deflected position is h+y when on unlevel ground. In this case, y is equal to the additional flex needed by the moment bars so the truck remains parallel to the ground. The distance y can be compared to the graphs in FIGS. 14 and 15 to see the extra moment caused by that deflection.

Figure 4:
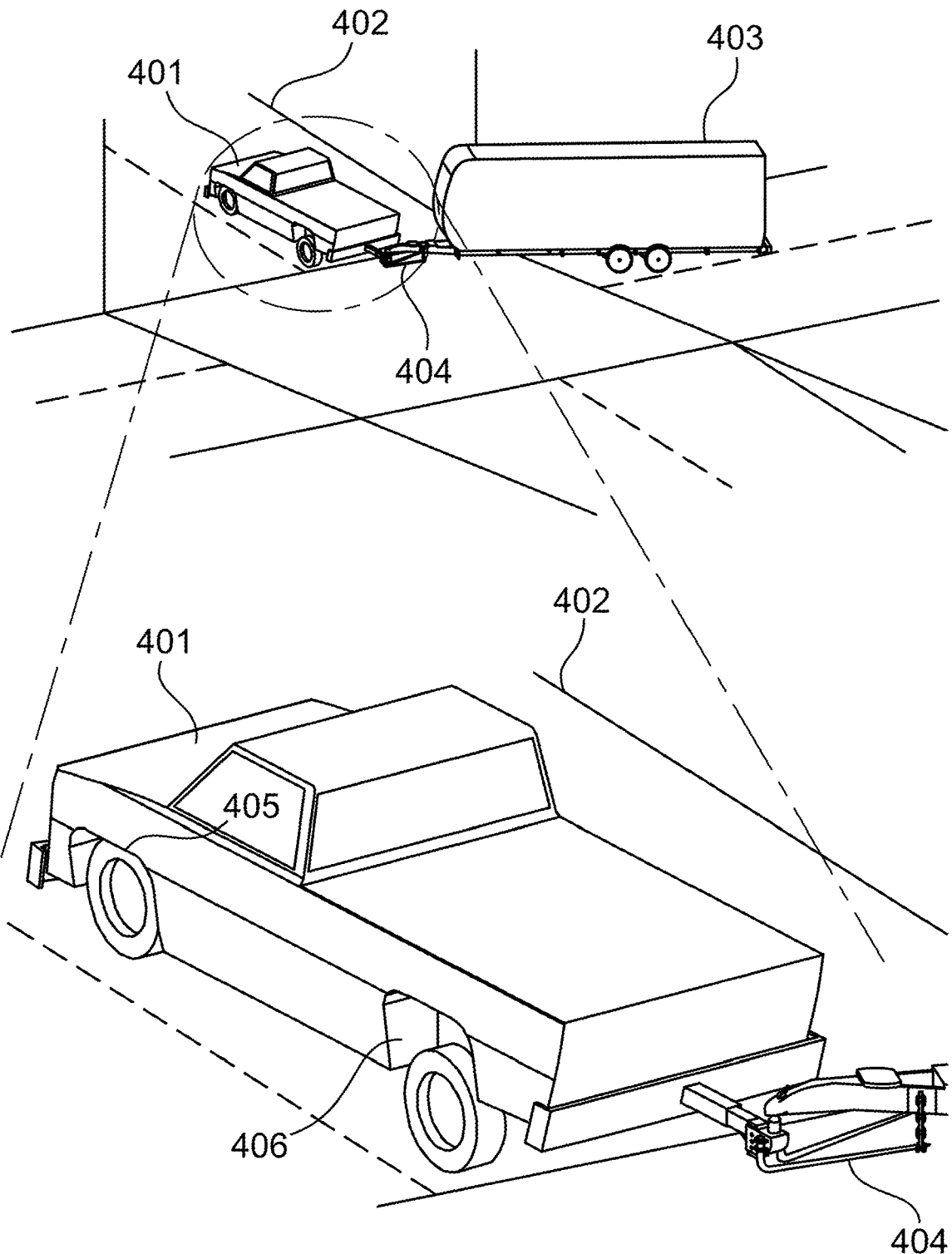
FIG. 4 is perspective view of a prior art weight distribution hitch responding to a turn.

Now referring to FIG. 4, a vehicle 401 is depicted turning up an inclined road 402 while pulling a trailer 403. In this scenario, the moment bars 404, which are stiff, are preventing the truck from angling up the road. This causes the front of the truck to be forced downward as shown by a reduced space above the front tires 405 and a greater space above the rear tires 406, which causes the rear wheels to lose traction. If the angle of the road is great enough, the rear end of the truck can even be lifted off the ground.

Figure 5:
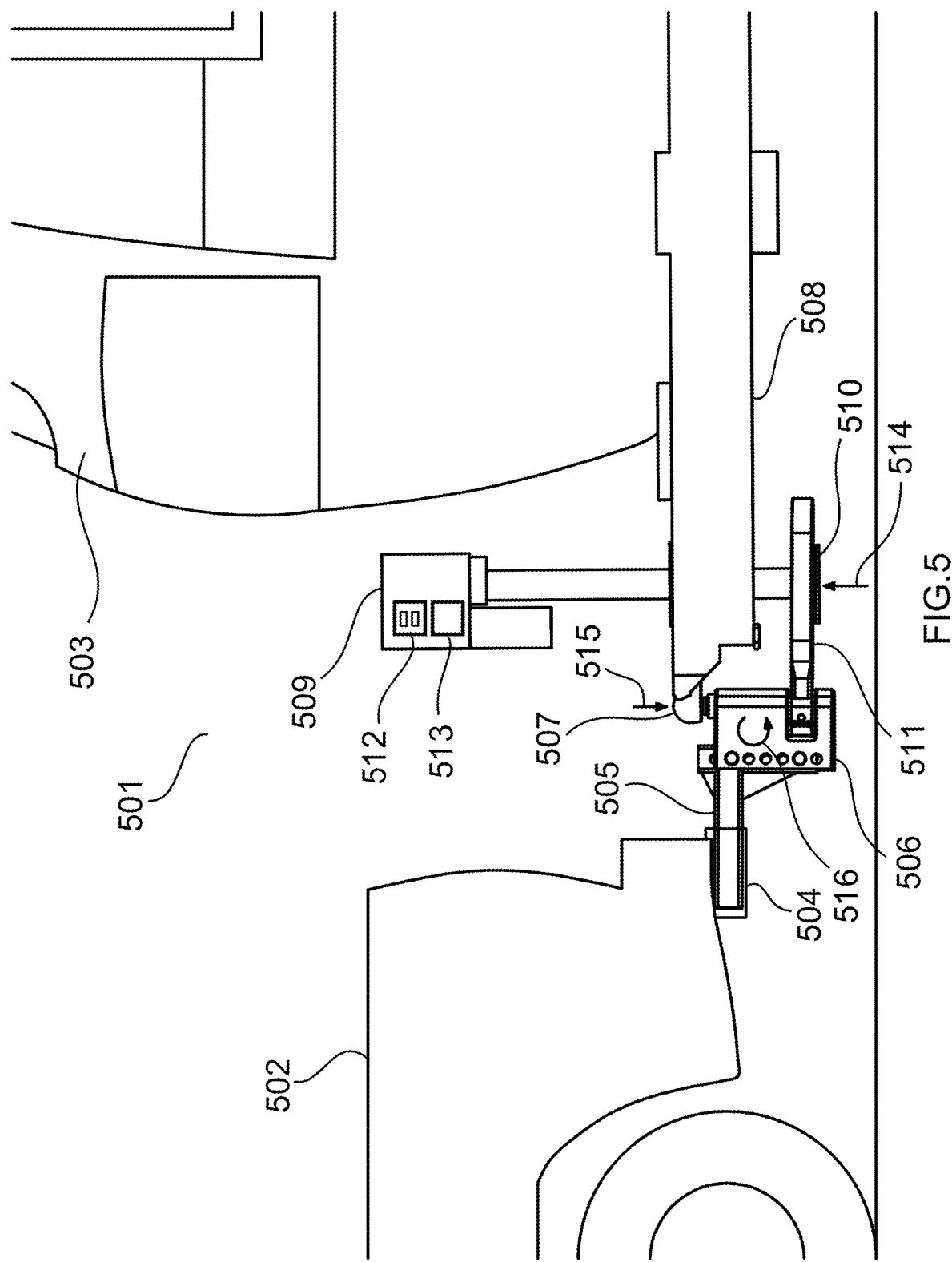
FIG. 5 is a side view of a second embodiment of a weight distribution hitch according to the present disclosure.

Now referring to FIG. 5, which shows one embodiment of the invention using an electric jack as a lifting mechanism. A weight distribution system 501 couples a vehicle 502 to a trailer 503. The system comprises a hitch receiver 504 connected to the underside of the vehicle 502. Extending rearwardly from the hitch receiver 504 is a shank 505, a ball mount 506, and a ball which is partially hidden under the coupler of the trailer 507. The hitch receiver, 504, shank 505, ball mount 506, and ball are all connected to the vehicle. On the trailer side of the system are a coupler 507, a frame 508, and a jack 509. The jack also contains a foot 510. A moment bar 511 may be a part of the truck side of the system or the trailer side of the system depending on user or manufacturer preference. The jack has at least two positions, an up position and a down position. While the foot is down, the jack supports the weight of the trailer and its shaft is in compression. While it is up, the foot abuts the underside of the moment bar 510 and the shaft is in tension between the moment bar 511 and the frame 508. The jack also has user controls 512, which typically includes a switch or buttons to move the jack between position one and position two, or to an intermediate position. That jack may be configured to weigh the load on the jack, either in compression, in tension, or both, and display the load on a load indicator 513. It may also communicate the load to a controller, such as a phone.

As depicted in FIG. 5, when the invention is in use to distribute the load forward on the vehicle, an upward force 514 increases the tongue weight 515 and imposes a moment 516 on the ball mount 506, which translates through the vehicle 102, adding a downward force to the front tires and an upward force to the rear tires, balancing the vehicle.

Now referring to FIG. 6, which shows one embodiment of a barrel coupling, which is one example of an attachment member. A dual sized ball 601 fits within a hitch head 602 and is pinned with a pin 603. The hitch head mounts to an adjustable shank 604. A moment bar coupler 605 has openings (not shown) to receive moment bars. The moment bar coupler 605 has a barrel insert 606 which slides into the barrel opening 607, to provide a connection that can rotate about a vertical axis but also translate a moment from the moment bars to the hitch head 602. A groove 608 in the barrel insert allows a clip (not shown) inside the hitch head 602 to hold the two pieces together.

Now referring to FIGS. 7A-E, which show additional views of the moment bar coupler 605. Two openings 701 are configured to receive moment bars (not shown). Holes 702 allow the moment bars to be fixed inside the hole, either with a set screw, a bolt, or other fastener.

Figure 8:
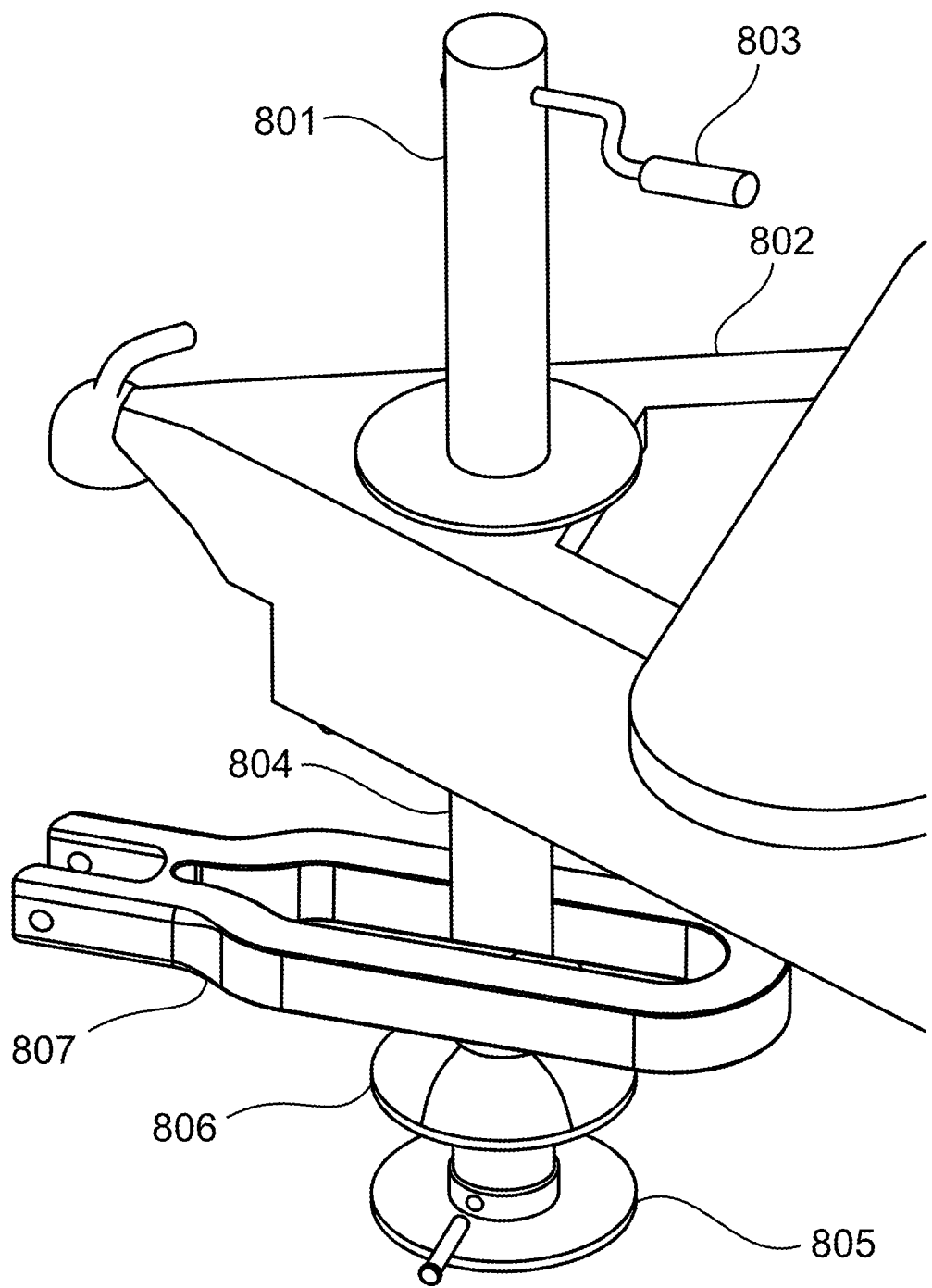
FIG. 8 is a side perspective views of a second exemplary embodiment of a weight distribution hitch having a moment bar with an aperture according to the present disclosure.

Now referring to FIG. 8, which shows another embodiment of the invention that includes a bearing plate on the jack. A jack 801 is mounted to the frame of a trailer 802. The jack includes a hand crank 803 to raise and lower the shaft 804. A foot 805 caps the bottom of the shaft 804 and gives a jack a stable bearing surface for the ground. A bearing plate 806 is attached to the shaft further up from the foot. In some embodiments of the invention, the bearing surface is flat, however, the depicted embodiment shows a convex surface. When the jack is in tension between the frame 802 and the moment bar 807, the convex shape of the bearing plate allows the abutting surfaces to roll slightly when the vehicle goes over bumps, rather than creating extreme point loads that an edge of a flat plate would create when the two surfaces are not parallel.

FIG. 8 also illustrates the way the moment bar 807 is locked onto the jack 801. In this configuration, the moment bar may be stored on the trailer with less risk of theft. This is also beneficial to users who would rather not have a moment bar or bars attached to their vehicles. However, other embodiments of the invention use moment bars that are easily removable from the jack, such as an open-ended bar that resembles a tuning fork.

Figure 9:
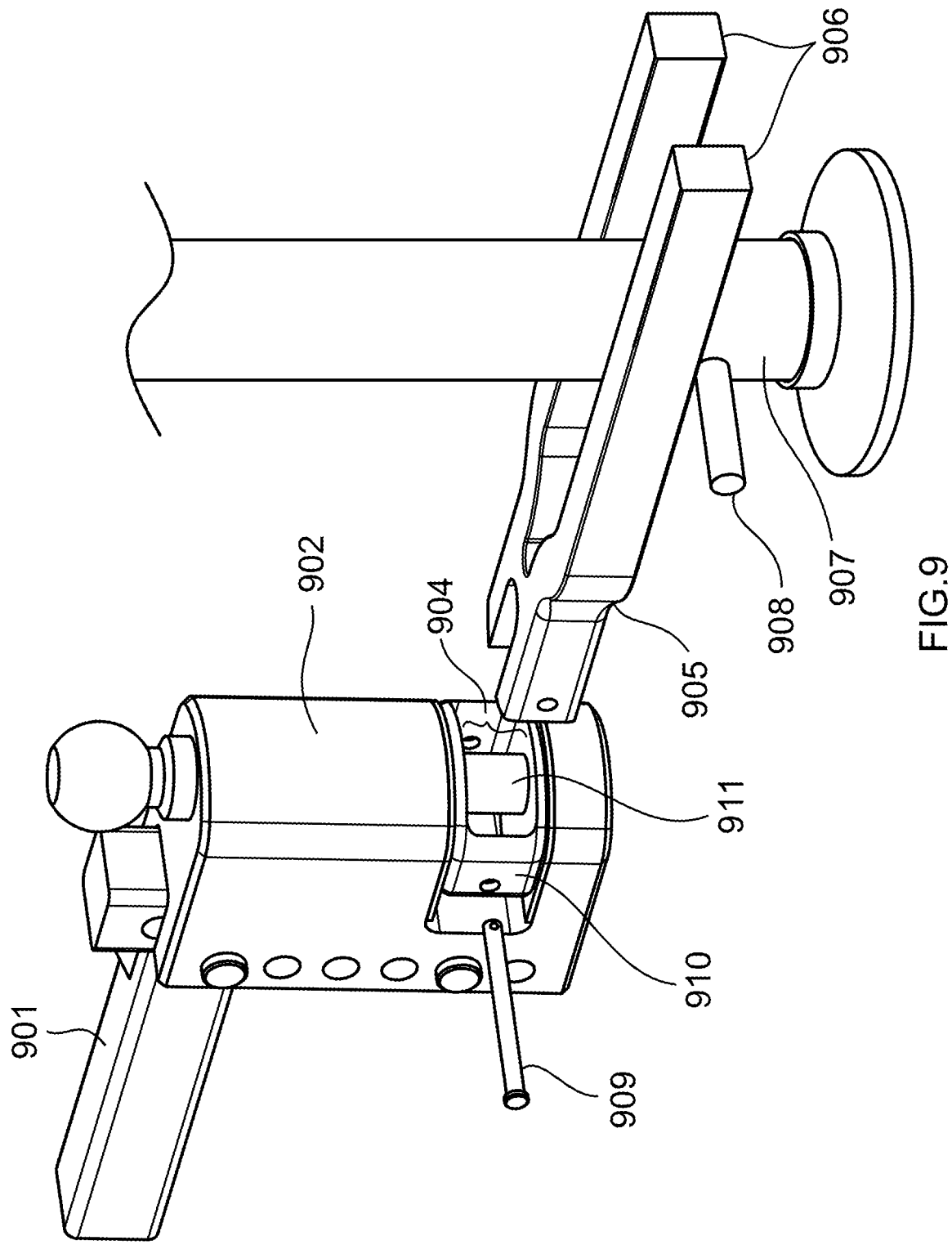
FIG. 9 is a side perspective view of the second embodiment.

Now referring to FIG. 9, which illustrates one embodiment of the way the invention may attach to a ball mount and an alternative configuration to abut the preload mechanism. A hitch shank 901 is pinned to a ball mount 902 through a series of holes allowing the attachment to be adjustable. The upper end of the ball mount is attached to a ball 903 for coupling to a trailer, whereas the lower end of the ball mount includes a socket 904 designed to receive a moment bar 905. In this configuration, the socket 904 pivots about a central pin 911. In other configurations the socket does not rotate, but the moment bar rotates within the socket. The socket 904 includes an upper bearing surface and a lower bearing surface which translate the moment from the moment bar 905 to the ball mount 902. They also may provide friction to assist with sway control for the trailer. The upper bearing surface and lower bearing surface may be made of steel, for ease of manufacturing and cost, but they may also be made of other materials in order to provide different properties for the connection, such as rust prevention and friction. A pin 909 keeps the moment bar 905 from slipping out of the socket 904.

In the embodiment of FIG. 9, the moment bar 905 has two prongs 906 which abut a bearing surface on the jack 907. In the depicted embodiment, the bearing surface is provided by pegs, however, it may also be another shape such as the bearing plate of FIG. 2, D-rings, or other.

Now referring to FIG. 10, which is an embodiment of the invention using a reversible moment bar. A moment bar 1001 is connected to a hitch head 1002 via a coupling 1003. The moment bar has a first end A and a second end B. The moment bar 1001 has a first major face C and a second major face D. The moment bar 1001 has a bend in it slightly off its center point which allows a different preloaded moment depending on its orientation, although in other embodiments, the moment bar has a bend at its centerline. The bend is shown at a single location for clarity, but a bend can also be continuous throughout the bar. The four graphics show the four different orientations, each causing a different preload adjustment. FIG. 10A shows the first major face C facing generally upward and the first end A is attached to the coupling 1003. FIG. 10B shows the first major face C facing generally downward and the first end A attached to the coupling 1003. FIG. 10C. shows the first major face C facing generally upward and the second end B is attached to the coupling 1003. FIG. 10D. shows the first major face C facing generally downward and the second end B is attached to the coupling 1003. Each orientation has a different starting height, which requires a different displacement for engagement with the holding bracket, which produces a different moment on the system. Alternatively, the moment bar may be symmetrical about the centerline of its longitudinal axis, allowing two different configurations rather than four.

Now referring to FIGS. 11A and 11B, which show an embodiment of the invention using springs to provide compliancy, or flex, to the system. A hitch head 1101 is mounted to a trailer frame 1102 and a moment bar 1103. A spring 1104 is supported by a bracket 1105, which is mounted to the trailer frame 1102. The moment bar 1103 is lifted on its rearward end by the spring 1104. FIG. 11A depicts normal operating conditions when the vehicle and trailer are on level ground. FIG. 11B depicts a condition where the vehicle is on uneven ground (i.e., the vehicle is pointed upward compared to the trailer) and the spring 1104 provides extra compliancy needed to protect the vehicle from an exaggerated moment.

Now referring to FIGS. 12A and 12B, which show an embodiment of the invention using springs to provide compliancy, or flex, to the system. A hitch head 1201 is mounted to a trailer frame 1202 and a moment bar 1203. A spring-bracket 1204 connects the moment bar 1203 to the frame 1202. The moment bar 1203 is lifted on its rearward end by the spring-bracket 1204. FIG. 12A depicts normal operating conditions when the vehicle and trailer are on level ground. FIG. 12B depicts a condition where the vehicle is on uneven ground (i.e., the vehicle is pointed upward compared to the trailer) and the spring-bracket 1204 provides extra compliancy needed to protect the vehicle from an exaggerated moment.

Now referring to FIGS. 13A and 13B, which show an embodiment of the invention using springs to provide compliancy, or flex, to the system. A hitch head 1301 is mounted to a trailer frame 1302 and a moment bar 1303. A spring 1304 is supported by a bracket 1305, which is mounted to the trailer frame 1302. The moment bar 1303 is lifted on its rearward end by the bracket 1305, which is suspended by spring 1304. FIG. 13A depicts normal operating conditions when the vehicle and trailer are on level ground. FIG. 13B depicts a condition where the vehicle is on uneven ground (i.e., the vehicle is pointed upward compared to the trailer) and the spring 1304 provides extra compliancy needed to protect the vehicle from an exaggerated moment.

Figure 14:
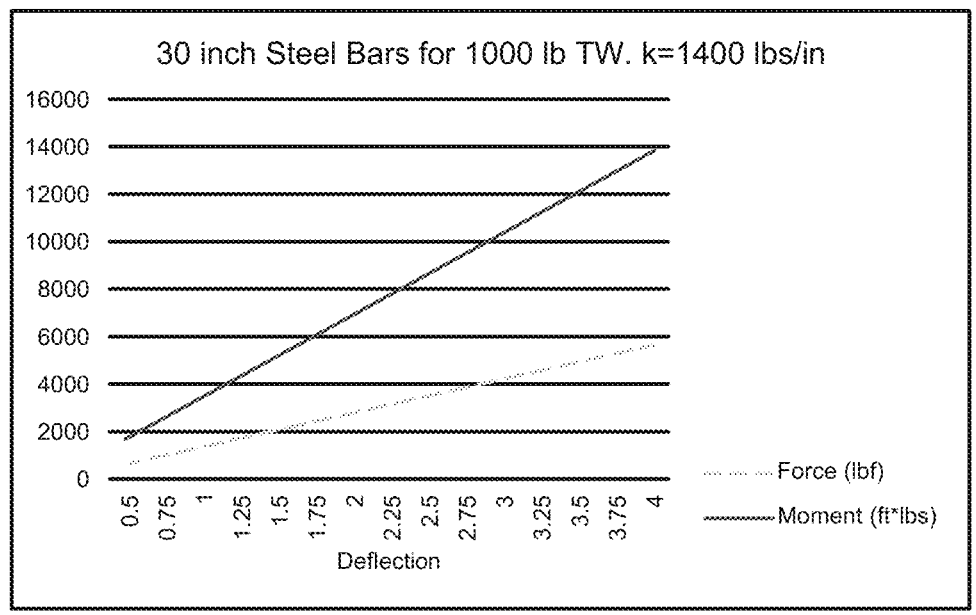
FIG. 14 is a graph showing both force and moment because of deflection of traditional moment bars.

Now referring to FIG. 14, which is a graph showing the relationship between an applied deflection of a system of two moment bars and the resulting force on the moment bars and moment on the system. The graph in FIG. 14 represents a traditional steel moment bar designed for a 1000 lb tongue weight, which is 30 inches long and has a spring constant of 1400 lbs/in.

Figure 15:
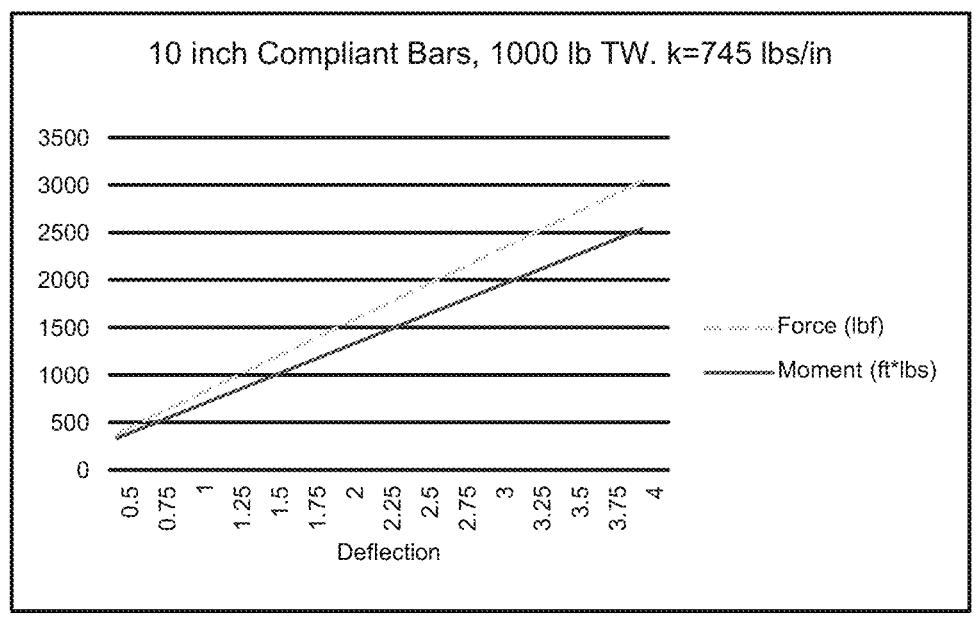
FIG. 15 is a graph showing both force and moment because of deflection of compliant moment bars.

Now referring to FIG. 15, which is a graph showing the relationship between an applied deflection of a system of two moment bars and the resulting force on the moment bars and moment on the system. The graph in FIG. 15 represents a compliant moment bar designed for a 1000 lb tongue weight, which is 10 inches long and has a spring constant of 745 lbs/in.

FIGS. 14 and 15 show how non-flat driving surfaces affect conventional weight distribution hitches compared to the disclosed hitches. The same degree of deflection causes much more force to be applied to the conventional moment bar than the disclosed moment bars. This makes the system more robust in response to changes in road level and helps keep the weight distribution in an acceptable range rather than allowing excess weight on either end of the tow vehicle.

Figure 16:
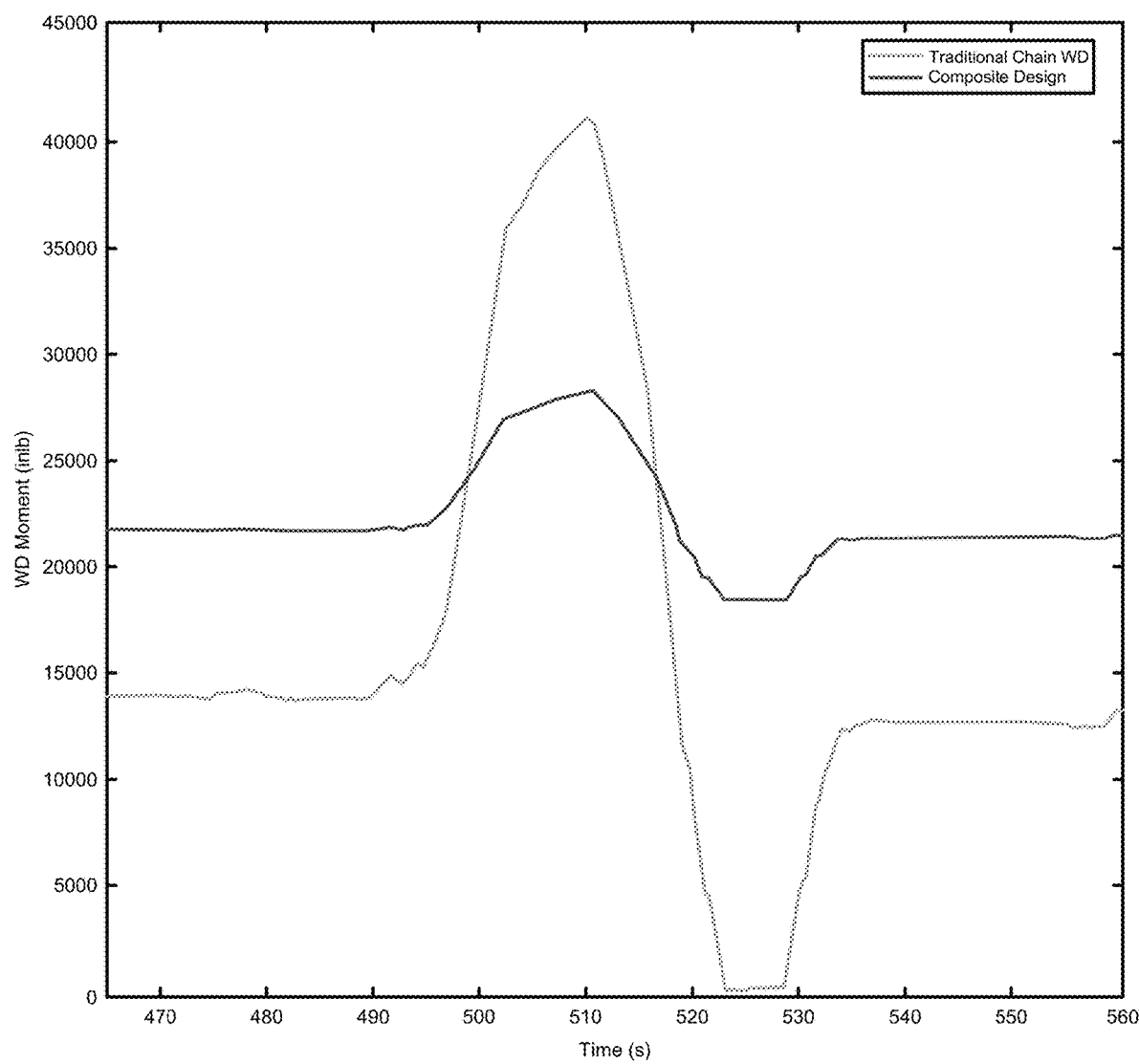
FIG. 16 is a graph showing moment over time comparing a traditional weight distribution hitch vs. one with a composite moment bar.

Now referring to FIG. 16, which is a graph showing a comparison in moments produced by a vehicle going over a hill with a traditional weight distribution system and a system with compliant moment bars. With the compliant bar, the amplitude of the change in moment is significantly reduced compared to a traditional moment bar.

In both examples, the deflection of the system is the same, but the force applied to the system with a compliant moment bar according to the present disclosure applies less force to the weight distribution hitch system than required for a conventional system. One advantage of this is that less stress is placed on the system to maintain proper weight distribution. Another advantage is that the system has a greater range of deflection in which an acceptable weight distribution is achieved making it easier to properly adjust the system.

A conventional weight distribution hitch may need to be adjusted to within a range of about 1/16 inches. If such a system is moved out of this range by road conditions (e.g., rises, dips, parking lot entrances, speed bumps, etc.) the load distribution may become incorrect, shifting it too much toward one end or the other of the tow vehicle. A weight distribution system according to the present disclosure can increase the acceptable range while also reducing how much the system moves in response to uneven driving surfaces.

Figure 17:
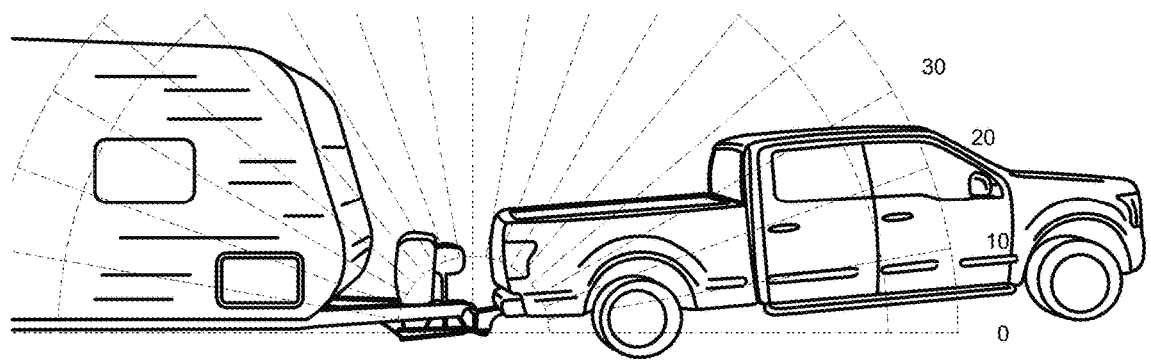
FIG. 17 is a side view of a truck with a prior art weight distribution hitch on flat ground.
Figure 18:
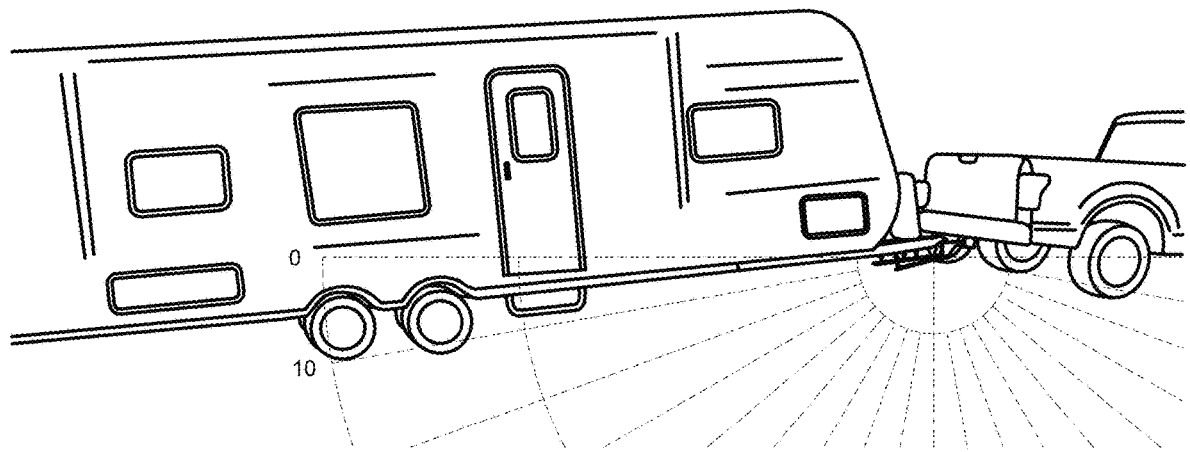
FIG. 18 is a side view of a truck with a prior art weight distribution hitch on uneven ground.

Now referring to FIGS. 17 and 18, which depict a vehicle crossing a rise and a dip, respectively. When the tow vehicle and trailer are at an angle of less than 180°, as shown in FIG. 17, the moment bar tends to lift the rear of the tow vehicle upward more than desired. When the angle between the tow vehicle and the trailer is greater than 180°, as shown in FIG. 18, the moment bar tends pull down too much on the rear of the vehicle. In either situation, the load balance is disrupted and the stress on the hitch system may be increased to the point that one or more systems components fail.

Now referring to FIG. 19, which is a graph showing a comparison in moments produced by a vehicle going over a bumpy road with a traditional weight distribution system and a system with compliant moment bars. With the compliant moment bar, the amplitude of the change in moment is reduced compared to a conventional moment bar. Because the amplitude of the initial change is reduced, the advantage due to the properties of composite material is two-fold: the amplitude of the initial change is reduced, and the settling time, or time it takes the system to return to normal after the disruption is reduced.

Figure 20A:
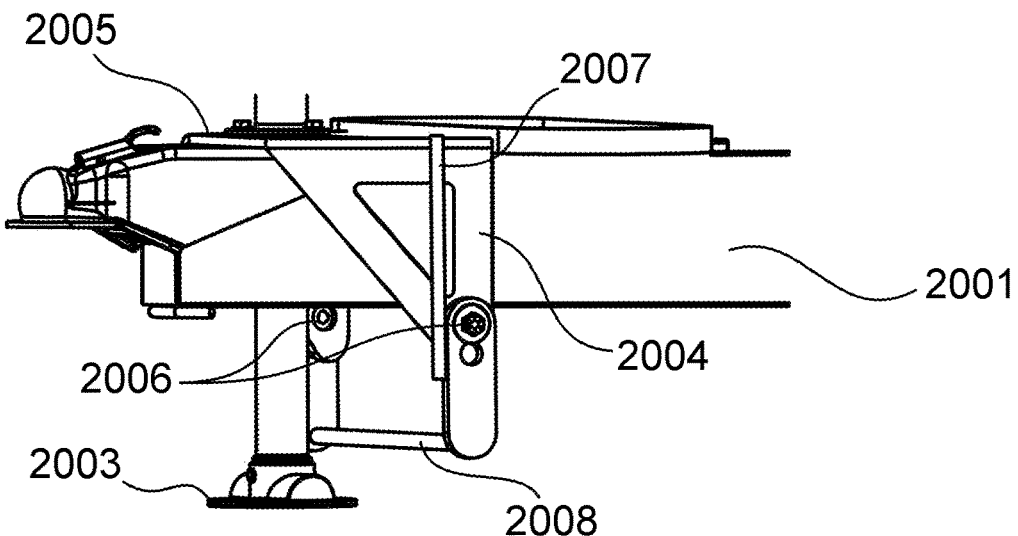
FIGS. 20A-20C are side perspective views of a sixth embodiments of a weight distribution hitch according to the present disclosure illustrating additional load bars.
Figure 20B:
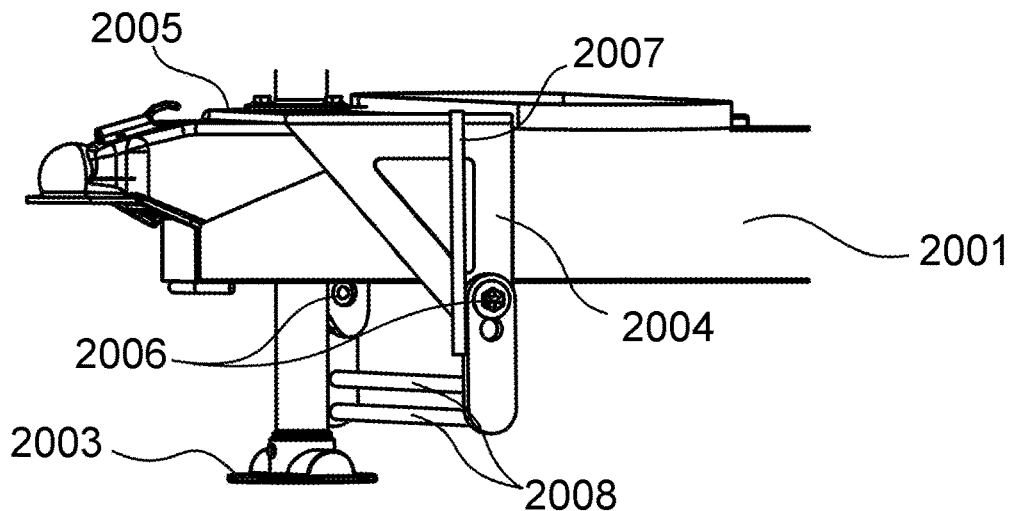
Figure 20C:
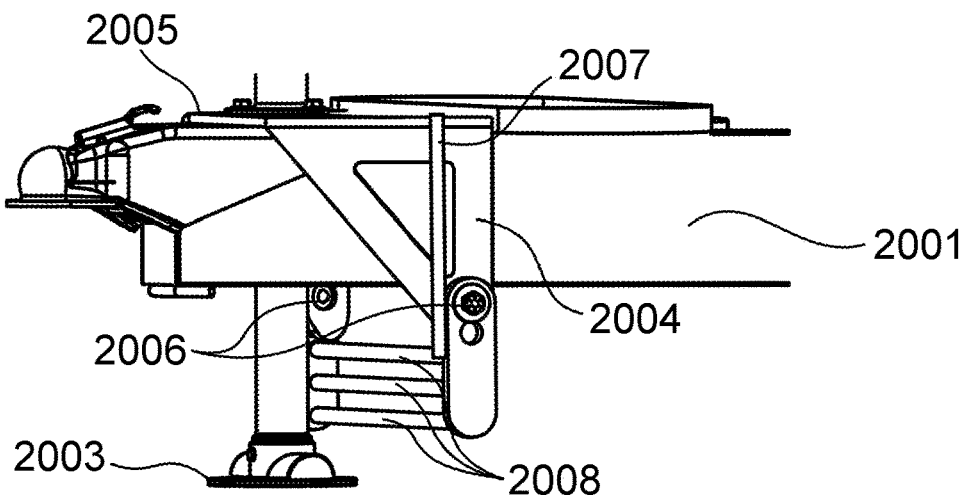

Now referring to FIG. 20, which shows various embodiments of a swing latch. A trailer frame 2001 has a jack 2002 mounted to it, the jack comprising a jack foot 2003. A swing latch 2004 comprises a saddle 2005 for mounting to the top of the frame, a hinge 2006, a handle 2007, and holding bars 2008 for holding moment bars (not shown) in an operating condition. FIGS. 20A-20C show different variations for swing latches utilizing multiple holding bars, i.e., 20A depicts a single bar, 20B depicts a dual level option, and 20C depicts a three-level option. In the multi-bar options, the higher bearing bars will impose a higher moment on the vehicle than the lower bearing bars.

All patents, published patent applications, and other publications referred to herein are incorporated herein by reference. The invention has been described with reference to various specific and preferred embodiments and techniques. Nevertheless, it is understood that many variations and modifications may be made while remaining within the spirit and scope of the invention.

What is claimed is:

1. A weight distribution hitch system, comprising:
   a vehicle attachment member comprising:
      a forward end configured to rigidly attach to a vehicle, and
      a rearward end extending rearwardly toward a trailer, the rearward end comprising:
         an upper portion comprising a trailer attachment member configured to pivotally attach to a coupler of the trailer, and
         a lower portion configured to receive a moment bar;
   a tension member comprising:
      a top end configured to be supported by a frame member of the trailer, and
      a bottom end, and
      a moment bar, the moment bar comprising:
         a first end configured to either be attached the lower portion of the rearward end of the vehicle attachment member or to be supported by the bottom end of the tension member,
         a second end also configured to either be attached to the lower portion of the rearward end of the vehicle attachment member or to be supported by the bottom end of the tension member,
         a first major face configured to face either generally upward or generally downward,
         a second major face opposite the first major face and also configured to face either generally upward or generally downward, and
         a bend between the first end and the second end;
      wherein, when the tension member is in tension, it imposes an upward force on the end of the moment bar that is supported by the tension member, which, in turn, imposes a forward moment on the vehicle; and
      wherein a preload on the moment bar is varied depending on whether the first major face faces generally upward or generally downward.

2. The system of claim 1, wherein the bend is closer to the first end than the second end and wherein the preload on the moment bar is also varied depending on whether the first end or the second end of the moment bar is attached to the lower portion of the rearward end of the vehicle attachment member.

3. The system of claim 1, wherein a jack pre-loads the bar.

4. The system of claim 3, wherein the jack comprises a laterally extending bearing member extending from at or near the bottom of the jack and configured to abut the bottom surface of the moment bar with enough force to lift the moment bar until enough of a forward moment is imposed on the vehicle to overcome a rearward moment imposed on the vehicle from a tongue of the trailer.

5. The system of claim 1, further comprising a second moment bar.

6. The system of claim 1, further comprising a lifting mechanism configured to lift the rearward end of the moment bar to a point where the tension member can engage the moment bar.

7. The system of claim 1, wherein the tension member comprises a hinge configured to allow the tension member to swing from a first position to a second position.

8. The system of claim 1, wherein the moment bar connects to the lower portion of the attachment member via a barrel coupling comprising an inner cylinder and an outer cylinder.

9. The system of claim 1, wherein the modulus of elasticity of the moment bar is less than 10,000 ksi.

10. The system of claim 1, further comprising a metal endcap to protect the moment bar from high point stresses, the metal endcap comprising a forward end and a rearward end, the forward end configured to receive and fix to the moment bar and the rearward end configured to abut the tension mechanism such that the upward force from the tension mechanism translates to the moment bar.

11. The system of claim 10, wherein the metal endcap is removable.

12. The system of claim 1, wherein the moment bar has a modulus of elasticity less than 15,000 ksi.

13. The system of claim 1, wherein the moment bar has a modulus of elasticity less than 14,000 ksi.

14. The system of claim 1, wherein the moment bar has a modulus of elasticity less than 13,000 ksi.

15. The system of claim 1, wherein the moment bar has spring constant less than 1,000 lbs/inch.

16. The system of claim 1, wherein the moment bar has spring constant less than 900 lbs/inch.

17. The system of claim 1, wherein the moment bar has spring constant less than 800 lbs/inch.

\* \* \* \* \*